US012399968B2

(12) United States Patent
Arai

(10) Patent No.: US 12,399,968 B2
(45) Date of Patent: Aug. 26, 2025

(54) INFORMATION PROCESSING APPARATUS, INFORMATION PROCESSING METHOD, AND STORAGE MEDIUM

(71) Applicant: NEC Corporation, Tokyo (JP)

(72) Inventor: Hiroshi Arai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 217 days.

(21) Appl. No.: 17/918,940

(22) PCT Filed: Mar. 26, 2021

(86) PCT No.: PCT/JP2021/013008
§ 371 (c)(1),
(2) Date: Oct. 14, 2022

(87) PCT Pub. No.: WO2021/215193
PCT Pub. Date: Oct. 28, 2021

(65) Prior Publication Data
US 2023/0289416 A1    Sep. 14, 2023

(30) Foreign Application Priority Data
Apr. 21, 2020  (JP) ................. 2020-075514

(51) Int. Cl.
G06F 21/32    (2013.01)
G06Q 20/10    (2012.01)
(Continued)

(52) U.S. Cl.
CPC ............. G06F 21/32 (2013.01); G06Q 20/10 (2013.01); G06Q 20/407 (2013.01); G06V 40/172 (2022.01)

(58) Field of Classification Search
None
See application file for complete search history.

(56) References Cited

U.S. PATENT DOCUMENTS 10,521,652 B1 *  12/2019  Trelin ................... G06V 40/10
11,204,991 B1 *  12/2021  Giraud ................. G06F 21/32
(Continued)

FOREIGN PATENT DOCUMENTS

JP    2016-053896 A    4/2016
JP    2016-057992 A    4/2016
(Continued)

OTHER PUBLICATIONS

International Search Report for PCT Application No. PCT/JP2021/013008, mailed on Jun. 15, 2021.

*Primary Examiner* — Christopher C Harris
(74) *Attorney, Agent, or Firm* — Sughrue Mion, PLLC

(57) ABSTRACT

An information processing apparatus according to the present invention includes: a first acquisition unit that acquires a first biometric information from a body of a user who requests an execution of a procedure; a second acquisition unit that acquires a second biometric information of the user from a passport presented by the user; a third acquisition unit that acquires qualification information of the user; a matching unit that performs a matching process between the first biometric information with the second biometric information; and a determination unit that determines whether or not the user is a target person of the procedure based on a result of the matching process and the qualification information.

14 Claims, 23 Drawing Sheets

(51) Int. Cl.
*G06Q 20/40* (2012.01)
*G06V 40/16* (2022.01)

(56) References Cited

U.S. PATENT DOCUMENTS

| | | | | |
|---|---|---|---|---|
| 2012/0075442 | A1* | 3/2012 | Vujic | G07C 9/257 |
| | | | | 235/472.01 |
| 2014/0289842 | A1* | 9/2014 | Cornick | H04L 9/3231 |
| | | | | 726/19 |
| 2016/0125179 | A1* | 5/2016 | Bouatou | G06F 21/32 |
| | | | | 340/5.82 |
| 2016/0189455 | A1* | 6/2016 | Lee | G07C 9/37 |
| | | | | 340/5.52 |
| 2017/0345235 | A1* | 11/2017 | Touret | G06F 21/32 |
| 2018/0181964 | A1* | 6/2018 | Zagarese | G06Q 20/40145 |
| 2018/0265201 | A1 | 9/2018 | Carlioz et al. | |
| 2019/0172167 | A1* | 6/2019 | Scholl | G06Q 50/26 |
| 2019/0172168 | A1* | 6/2019 | Singh | G06Q 20/40145 |
| 2019/0268158 | A1* | 8/2019 | Lentini | H04L 9/30 |
| 2020/0311237 | A1* | 10/2020 | De Vos | G07C 9/253 |
| 2021/0117656 | A1* | 4/2021 | Garcia | G06F 21/32 |
| 2021/0192657 | A1 | 6/2021 | Nakashima et al. | |
| 2021/0279989 | A1* | 9/2021 | O'Sullivan | G06N 20/00 |
| 2022/0130534 | A1* | 4/2022 | Romanychev | G16H 40/67 |
| 2022/0179988 | A1* | 6/2022 | Andreina | G06Q 50/265 |

FOREIGN PATENT DOCUMENTS

| | | | |
|---|---|---|---|
| JP | 2017-505478 A | | 2/2017 |
| JP | 2017123202 A | * | 7/2017 |
| JP | 2017-182387 A | | 10/2017 |
| JP | 2017-191527 A | | 10/2017 |
| JP | 2018-513803 A | | 5/2018 |
| JP | 6335295 B2 | | 5/2018 |
| JP | 6434561 B2 | | 12/2018 |
| JP | 2020-013525 A | | 1/2020 |
| WO | 2017/033291 A1 | | 3/2017 |
| WO | 2019/225553 A1 | | 11/2019 |

* cited by examiner

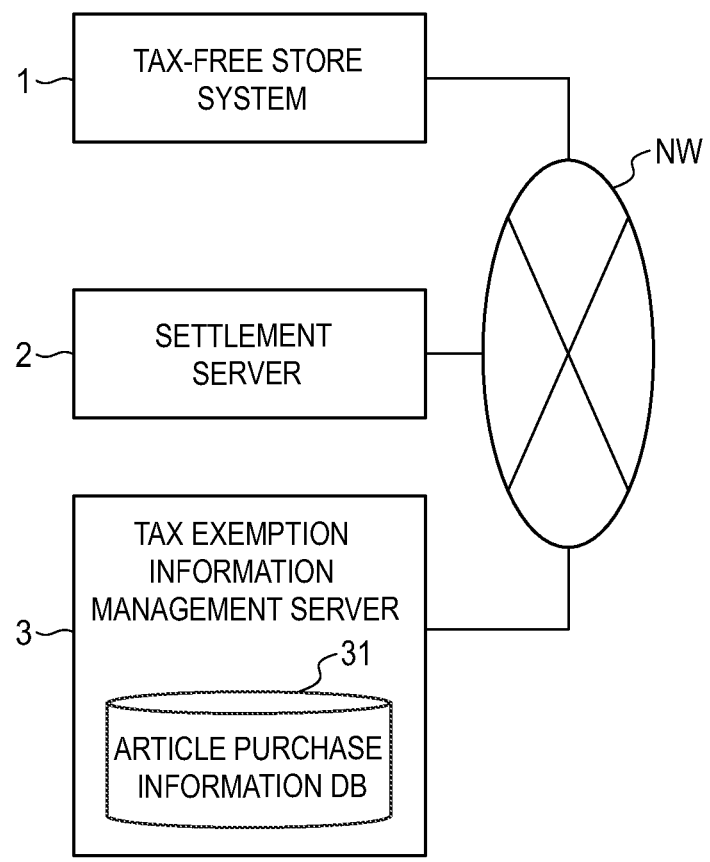
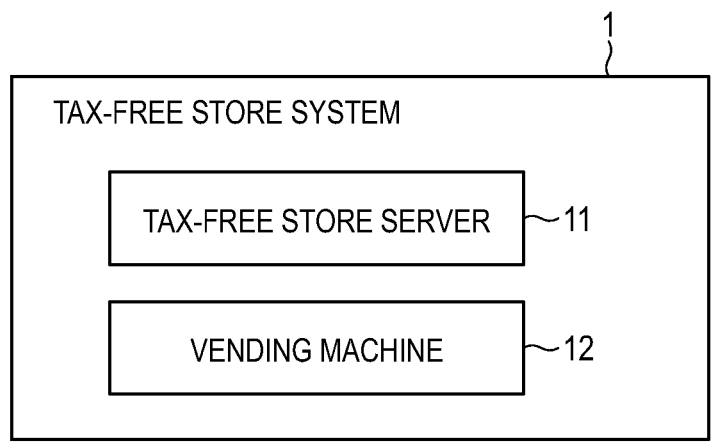

FIG. 6

| PASSPORT NUMBER | NAME | GENDER | NATIONALITY | CODE | NAME OF PURCHASED ARTICLE | CLASSIFICATION | PAYMENT (YEN) |
|---|---|---|---|---|---|---|---|
| 123456789 | ***** | MALE | AAA | 49123456 | CAMERA | GENERAL ARTICLES | 20,000 |
| 234567890 | ***** | MALE | BBB | 49345678 | SHOES | GENERAL ARTICLES | 25,000 |
| 234567890 | ***** | FEMALE | CCC | 49456789 | PHARMACEUTICALS | CONSUMABLES | 1,500 |
| ... | ... | ... | ... | ... | ... | ... | ... |

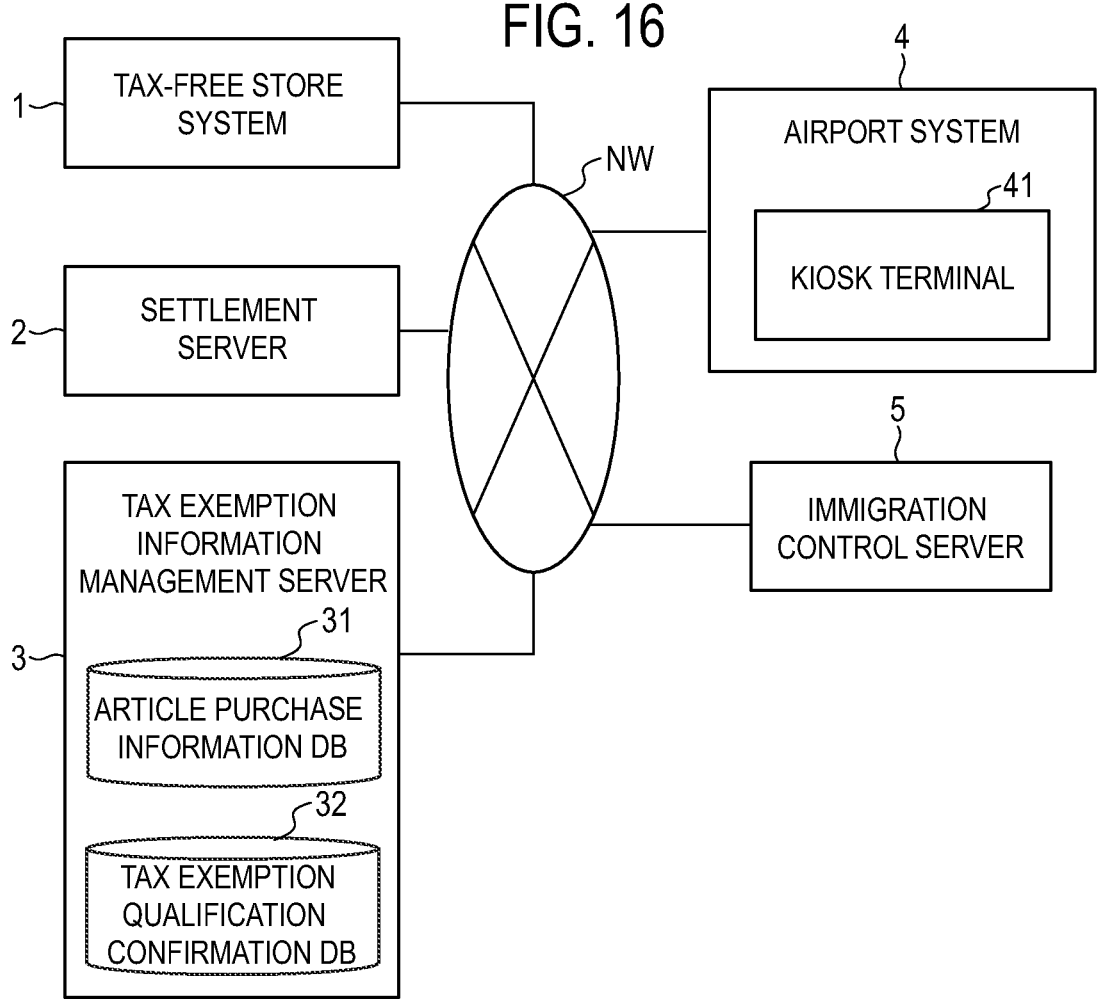

INFORMATION PROCESSING APPARATUS, INFORMATION PROCESSING METHOD, AND STORAGE MEDIUM

This application is a National Stage Entry of PCT/JP2021/013008 filed on Mar. 26, 2021, which claims priority from Japanese Patent Application 2020-075514 filed on Apr. 21, 2020, the contents of all of which are incorporated herein by reference, in their entirety.

TECHNICAL FIELD

The present invention relates to an information processing apparatus, an information processing method, and a storage medium.

BACKGROUND ART

Patent literature 1 discloses a settlement support system that streamlines the purchase of articles at tax-free facilities. The settlement support system in the patent literature 1 determines whether or not the settlement is permissible based on biometric authentication using biometric information of travelers.

CITATION LIST

Patent Literature

PTL 1: International Publication No. 2017/033291

SUMMARY OF INVENTION

Technical Problem

Like a procedure of a purchase of an article at a tax-free facility by a user, there are procedures in which both identity verification of the user holding a passport and confirmation of the user's qualifications for use are required by laws and regulations. However, the settlement support system exemplified in the Patent Literature 1 does not take into account a procedure for automatically determining whether or not a user is a target person for the tax exemption procedure. For this reason, the system must confirm whether or not the user is the target person of tax exemption procedure based on another method, such as visual confirmation by a staff. In this way, there is room to improve the efficiency in the procedures that require both identity verification of the user and confirmation of the user's qualifications for use.

Therefore, in view of the above problems, an object of the present invention is to provide an information processing apparatus, an information processing method and a storage medium that can efficiently perform procedures requiring both identity verification of a user and confirmation of the user's qualifications for use.

Solution to Problem

According to one aspect of the present invention, there is provided an information processing apparatus including: a first acquisition unit that acquires a first biometric information from a body of a user who requests an execution of a procedure; a second acquisition unit that acquires, from a passport presented by the user, a passport number and a second biometric information of the user; a matching unit that performs a matching process between the first biometric information and the second biometric information; a requesting unit that outputs, when the identity verification of the user is successfully completed by the matching process, the passport number to an external device configured to determine whether or not the user is the target person of the procedure based on the passport number; and a third acquisition unit that acquires a determination result from the external device whether or not the user is the target person.

According to another aspect of the present invention, there is provided an information processing method including: acquiring a first biometric information from a body of a user who requests an execution of a procedure; acquiring a second biometric information of the user from a passport presented by the user; acquiring qualification information of the user; performing a matching process between the first biometric information and the second biometric information; and determining whether or not the user is a target person of the procedure based on a result of the matching process and the qualification information.

According to yet another aspect of the present invention, there is provided a storage medium storing a program that causes a computer to perform: acquiring a first biometric information from a body of a user who requests an execution of a procedure; acquiring a second biometric information of the user from a passport presented by the user; acquiring qualification information of the user; performing a matching process between the first biometric information and the second biometric information; and determining whether or not the user is a target person of the procedure based on a result of the matching process and the qualification information.

According to yet another aspect of the present invention, there is provided an information processing apparatus including: a first acquisition unit that acquires a first biometric information from a body of a user who requests an execution of a procedure; a second acquisition unit that acquires, from a passport presented by the user, a passport number and a second biometric information of the user; a matching unit that performs a matching process between the first biometric information and the second biometric information; a requesting unit that outputs, when the identity verification of the user is successfully completed by the matching process, the passport number to an external device configured to determine whether or not the user is the target person of the procedure based on the passport number; and a third acquisition unit that acquires a determination result from the external device whether or not the user is the target person.

According to yet another aspect of the present invention, there is provided an information processing method including: acquiring a first biometric information from a body of a user who requests an execution of a procedure; acquiring, from a passport presented by the user, a passport number and a second biometric information of the user; performing a matching process between the first biometric information and the second biometric information; outputting, when the identity verification of the user is successfully confirmed by the matching process, the passport number to an external device configured to determine whether or not the user is the target person of the procedure based on the passport number; and acquiring a determination result from the external device whether or not the user is the target person.

According to yet another aspect of the present invention, there is provided a storage medium storing a program that causes a computer to perform: acquiring a first biometric information from a body of a user who requests an execution of a procedure; acquiring, from a passport presented by the user, a passport number and a second biometric information of the user; performing a matching process between the first biometric information and the second biometric information; outputting, when the identity verification of the user is successfully confirmed by the matching process, the passport number to an external device configured to determine whether or not the user is the target person of the procedure based on the passport number; and acquiring a determination result from the external device whether or not the user is the target person.

Advantageous Effects of Invention

According to the present invention, an information processing apparatus, an information processing method, and a storage medium that can efficiently perform procedures requiring both identity verification of a user and confirmation of the user's qualifications for use.

BRIEF DESCRIPTION OF DRAWINGS

FIG. 1 is a schematic diagram illustrating an overall configuration of an information processing system according to a first example embodiment.

FIG. 2 is a block diagram illustrating a hardware configuration of a tax-free store system according to the first example embodiment.

FIG. 6 is a diagram illustrating an example of information stored in an article purchase information DB according to the first example embodiment.

FIG. 16 is a schematic diagram illustrating the overall configuration of the information processing system according to a fourth embodiment.

FIG. 17 is a diagram illustrating an example of information stored in a tax exemption qualification confirmation DB according to the fourth embodiment.

DESCRIPTION OF EMBODIMENTS

Figure 3:
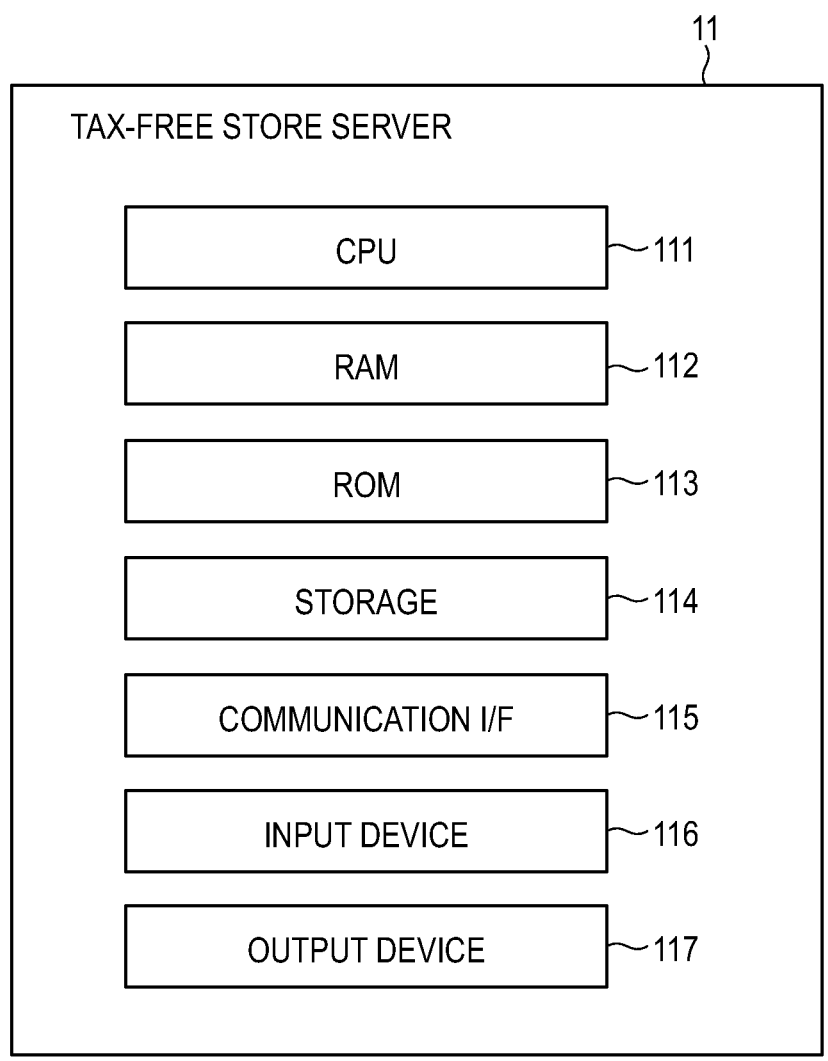
FIG. 3 is a block diagram illustrating the hardware configuration of the tax-free store server according to the first example embodiment.

Exemplary example embodiments of the present invention will be described below with reference to the drawings. Throughout the drawings, the same elements or corresponding elements are labeled with the same references, and the description thereof may be omitted or simplified.

First Example Embodiment

The information processing system according to the present example embodiment will be described. The information processing system of the present example embodiment is a system that supports a tax exemption process (procedure for the tax exemption) in a tax exemption facility. Here, the tax-free facility can typically be a tax-free store in a city (a place of sale for an article to be exported).

The term "tax-free" indicates exemption from consumption tax when the information processing system according to the present example embodiment is used for tax exemption procedure at tax-free stores in a city in Japan. However, when the information processing system according to the present example embodiment is used in other tax-free facilities, the "tax exemption" may also include exemptions from value-added tax, liquor tax, tobacco tax, customs duty, and the like.

As long as otherwise noted, in the following explanation, the information processing system according to the present example embodiment shall be applied to tax exemption procedures at tax-free stores in a city in Japan. However, it is not limited to this, and the information processing system according to the present example embodiment may be used for the tax exemption procedure in tax-free stores in countries other than Japan. In that case, the contents of processing may be modified accordingly, depending on the tax system of each country.

FIG. 1 is a schematic diagram illustrating the overall configuration of the information processing system according to the present example embodiment. The information processing system includes a tax-free store system 1, a settlement server 2, and a tax exemption information management server 3. The tax-free store system 1, the settlement server 2, and the tax exemption information management server 3 are communicably connected via a network NW.

The network NW can be a variety of networks, such as a local area network (LAN), or a wide area network (WAN). The network NW can be, for example, the Internet.

The tax-free store system 1 is a system built in the tax-free store and may include a server, a point of sales (POS) system, a KIOSK terminal, and the like. In the present example embodiment, it is described the case where the tax-free store system 1 includes a vending machine, but details will be described later.

The settlement server 2 is a server for settling a payment of a purchased article at the tax-free store. The settlement server 2 provides functions of electronic settlement by a credit card, a debit card, a prepaid card, an electronic money, a virtual currency, and the like, in response to a request from the tax-free store system 1.

The tax exemption information management server 3 is a server that manages information on the tax exemption procedure for persons (non-residents) who do not reside in Japan. The tax exemption information management server 3 includes an article purchase information DB 31. It is assumed that the article purchase information DB 31 includes the purchase information of a tax-exempt article purchased by non-residents during their stay in Japan.

FIG. 2 is a block diagram illustrating a hardware configuration of the tax-free store system 1. The tax-free store system 1 includes a tax-free store server 11 and the vending machine 12.

The tax-free store server 11 is a computer that stores data used in tax-free stores, such as sales data and article (merchandise) data obtained from the vending machine 12.

FIG. 3 is a block diagram illustrating the hardware configuration of the tax-free store server 11. The tax-free store server 11 includes a central processing unit (CPU) 111, a random access memory (RAM) 112, a read-only memory (ROM) 113, and a storage 114. The tax-free store server 11 also includes a communication interface (I/F) 115, an input device 116, and an output device 117. Each part of the tax-free store server 11 is connected to each other via buses, wiring, driving devices, and the like (not illustrated).

In FIG. 3, the components of the tax-free store server 11 are illustrated as an integrated device, but some of these functions may be provided by an external device. For example, the input device 116 and the output device 117 may be external devices separate from the parts that constitute the functions of the computer including such as the CPU 111.

The CPU 111 is a processor that performs predetermined operations according to programs stored in the ROM 113, storage 114, and the like. The CPU 111 also has a function to control each part of the tax-free store server 11. The RAM 112 is formed of a volatile storage medium and provides a temporary memory area necessary for the operations of the CPU 111.

The ROM 113 is formed of a nonvolatile storage medium and stores necessary information such as programs used for the operation of the tax-free store server 11. The storage 114 is formed of a nonvolatile storage medium such as a hard disk drive (HDD) or a solid-state drive (SSD) and is a storage for storing a database, storing an operating program of the tax-free store server 11, and the like.

The communication I/F 115 is a communication interface based on standards such as the Ethernet (Registered trademark). The communication I/F 115 is a module for communicating with other devices such as the settlement server 2.

The input device 116 is a keyboard, a pointing device, and the like. The input device 116 is used by a manager of the tax-free store server 11 to operate the tax-free store server 11. Examples of pointing devices include a mouse, a trackball, a touch panel, a pen tablet, and the like.

The output device 117 is, for example, a display device. The display device is a liquid crystal display, an organic light-emitting diode (OLED) display, and the like. The display device is used for displaying information by a graphical user interface (GUI) for operation input, and the like. The input device 116 and the output device 117 may be integrally formed as a touch panel.

The hardware configuration of the tax-free store server 11 is an example, a device other than the above may be added, or some of the devices may not be provided. Further, some of the devices may be replaced with another device having substantially the same function. Further, some functions in the present example embodiment may be provided by another device via the network, or the functions in the present example embodiment may be distributed to a plurality of devices and implemented therein.

The hardware configurations of the settlement server 2 and the tax exemption information management server 3 are the same as those illustrated in FIG. 3, the description thereof may be omitted.

The vending machine 12 is a device that automatically performs the identity verification process of the user, the determination process of whether or not the user has qualifications to be subject to the tax exemption, the settlement process for a payment of the purchased articles, and the like when the user performs an operation for purchasing the tax-exempt article. Details of the functions provided in the vending machine 12 according to the present example embodiment will be described later.

Figure 4:
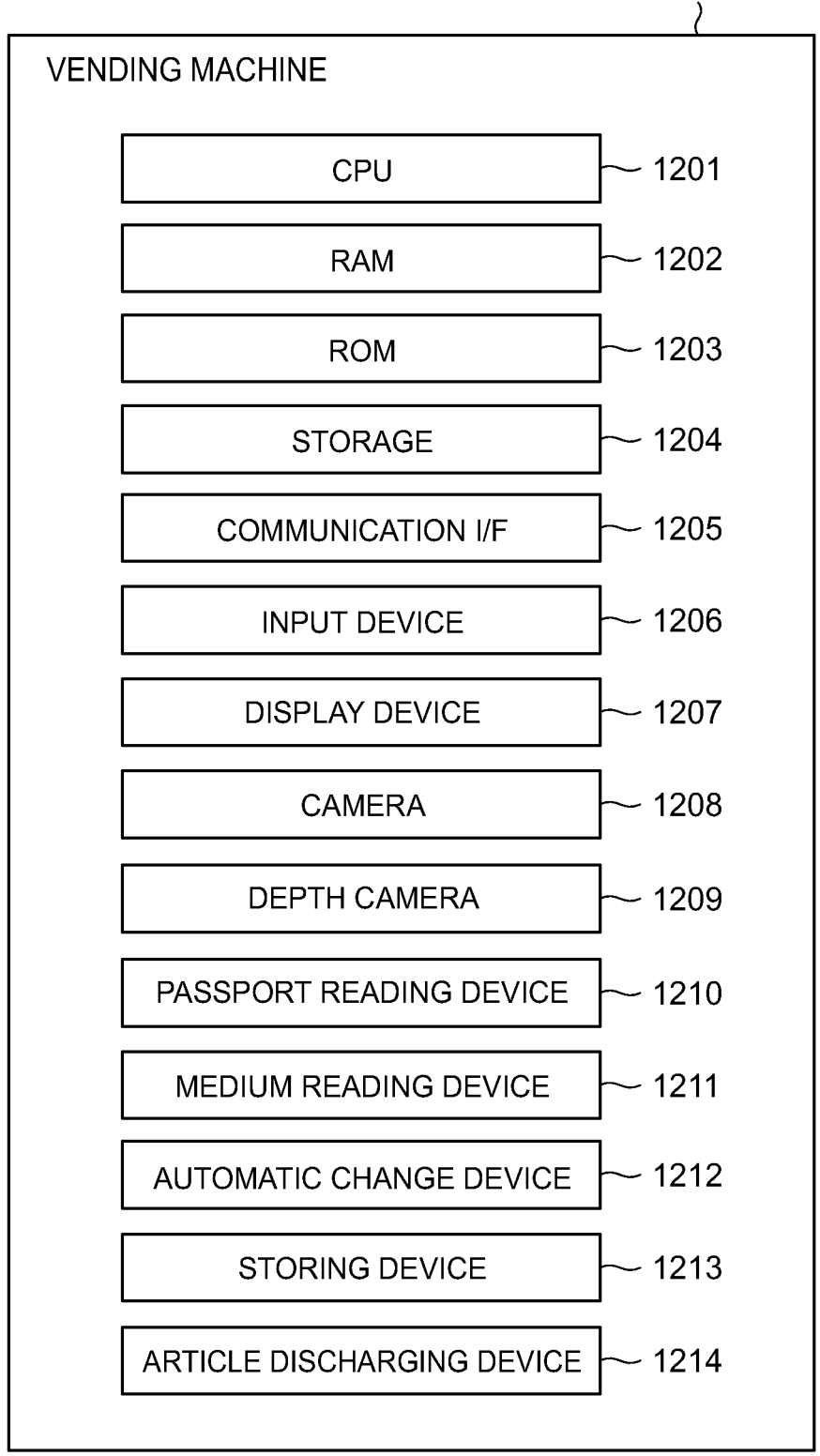
FIG. 4 is a block diagram illustrating the hardware configuration of a vending machine according to the first example embodiment.

FIG. 4 is a block diagram illustrating the hardware configuration of the vending machine 12. In the following descriptions, devices with the same name but different signs are equivalent devices, and therefore detailed descriptions may be omitted.

The vending machine 12 includes a CPU 1201, a RAM 1202, a ROM 1203, a storage 1204, a communication I/F 1205, an input device 1206, and a display device 1207, similar to the configuration in FIG. 3. The vending machine 12 also further includes a camera 1208, a depth camera 1209, a passport reading device 1210, a medium reading device 1211, an automatic change device 1212, a storing device 1213, and an article discharging device 1214. Each part of the vending machine 12 is connected to each other via buses, wiring, driving devices, and the like (not illustrated).

The display device 1207 is the liquid crystal display, the OLED display, and the like. The display device 1207 is used for displaying information, a GUI for operation input, and the like. In the vending machine 12, the input device 1206 and the display device 1207 may be formed as an integrated touch panel.

The camera 1208 is, for example, a digital camera that captures the face of a user standing in front of the vending machine 12. The camera 1208 captures the face of the user and acquires the face image of the user.

The depth camera 1209 acquires three-dimensional information of an object captured by the camera 1208. Based on the three-dimensional information acquired by the depth camera 1209, the CPU 1201 determines whether or not the user's face image captured by the camera 1208 is acquired from a real human. That is, the CPU 1201 determines, based on the three-dimensional information, whether or not the captured face image is acquired from an object (e.g., a user's photograph) that is not a real human. In this way, it is possible to prevent third parties from cheating by disguising themselves as the user.

The passport reading device 1210 is a device that reads information recorded in the passport carried by the user. Examples of the passport reading device 1210 include an optical character reader (OCR) device, an image scanner, a contactless integrated circuit (IC) reader, and the like.

The passport reading device 1210 is provided such that a reading unit for reading a passport faces upward, for example, and is configured to have a slot into which the passport is inserted above the reading unit thereof. In such a case, the user inserts the passport into the slot with the identity page and visa column opened, facing the page down. The user holds the passport over the reading unit of the passport reading device 1210. In this way, the user is able to have the passport read by the passport reading device 1210.

In a system in which a passport is inserted into a slot, once a passport is inserted into the slot, the user is not required to continue to press the passport to keep the page opened and is able to accurately position the passport to the reading unit of the passport reading device 1210. This can realize the smooth reading of a passport. Note that the configuration of the passport reading device 1210 is not limited to the above configuration, and various configurations may be employed.

The medium reading device 1211 is a device that reads information recorded on various medium carried by the user. Examples of the medium reading device 1211 include an OCR device, an image scanner, a code reader, a contactless IC reader, and the like. Examples of recording medium include credit cards, electronic money cards and smartphones displaying barcodes for payment.

The automatic change device 1212 is a device that processes cash injected by the user for payment of tax-exempt article and automatically discharges change as necessary. The automatic change device 1212 includes a cash depositing/dispensing device that processes the depositing/dispensing of bills and coins.

The storing device 1213 is a device for storing tax-exempt articles. In the present example embodiment, it is assumed that the tax-exempt article is stored in a pre-packed state inside the storing device 1213. For example, the storage 1204 stores data that indicates the storage location of the tax-exempt article in the storing device 1213. The article discharging device 1214 is a device for extracting the target article purchased by the user from the storing device 1213 to discharge the target article from the discharge port.

Figure 5:
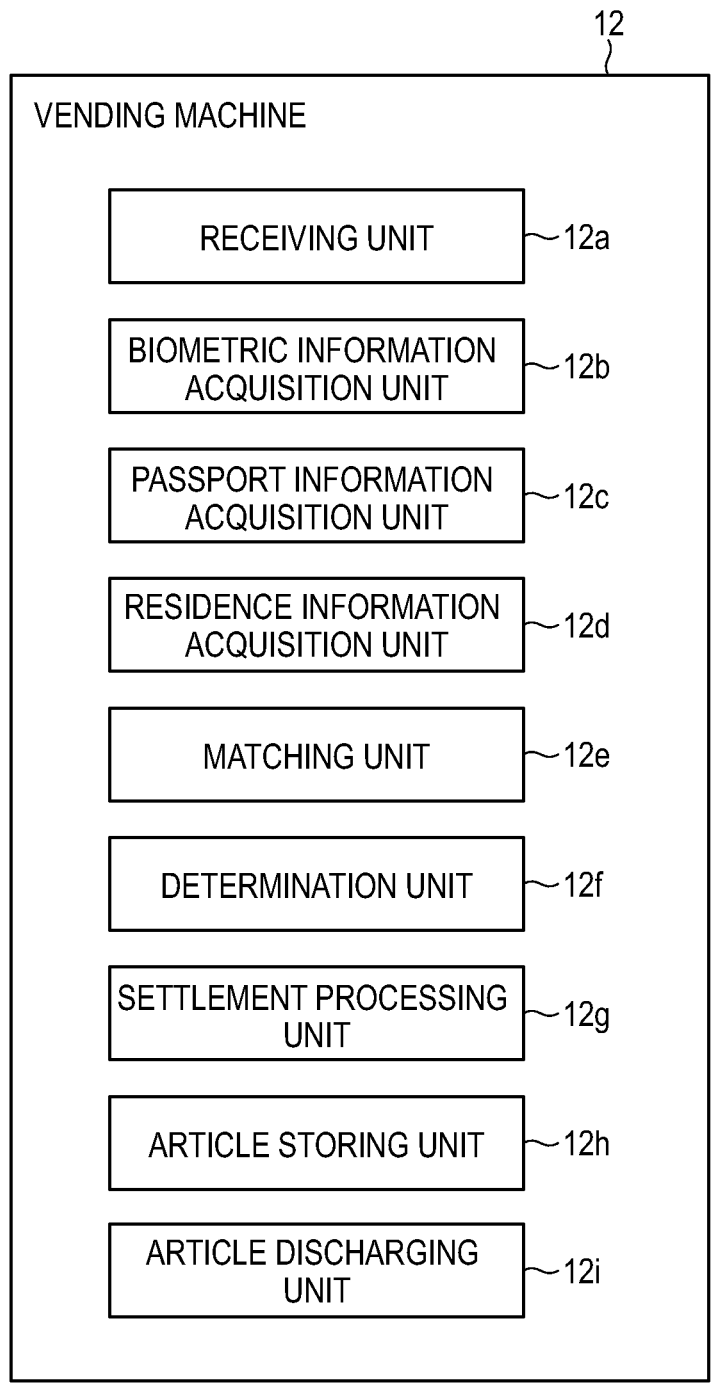
FIG. 5 is a functional block diagram of the vending machine according to the first example embodiment.

FIG. 5 is a functional block diagram of the vending machine 12. The vending machine 12 includes a receiving unit 12a, a biometric information acquisition unit 12b, a passport information acquisition unit 12c, a residence information acquisition unit 12d, a matching unit 12e, a determination unit 12f, a settlement processing unit 12g, an article storage unit 12h and an article discharge unit 12i.

The CPU 1201 performs predetermined arithmetic processing by loading programs stored in such as the ROM 1203 and the storage 1204, into the RAM 1202 and executing them. The CPU 1201 controls each part of the vending machine 12 such as the communication I/F 1205 based on the program. Accordingly, the CPU 1201 realizes the functions of each functional block illustrated in FIG. 5. Details of the specific processing performed by each functional block will be described later.

Note that some of the functions of the functional blocks described in the vending machine 12 in FIG. 5 may be provided in devices outside the vending machine 12. That is, each of the functions described above may be realized by the vending machine 12 alone or in cooperation with external devices.

FIG. 6 is a diagram illustrating an example of information stored in the article purchase information DB 31. The article purchase information DB 31 may include "passport number", "name", "gender", "nationality", "code", "name of purchased article", "classification", and "payment" as data items. The information in the fields of "passport number", "name", "gender", and "nationality" is passport information read by optical or electromagnetic methods from the user's passport. In addition, "general articles" and "consumables" listed in the "classification" column are the classification of the tax-exempt article under the tax exemption system in Japan. The tax-free store server 121 stores a merchandise database that is used for acquiring various information associated with the code, in advance.

Figure 7:
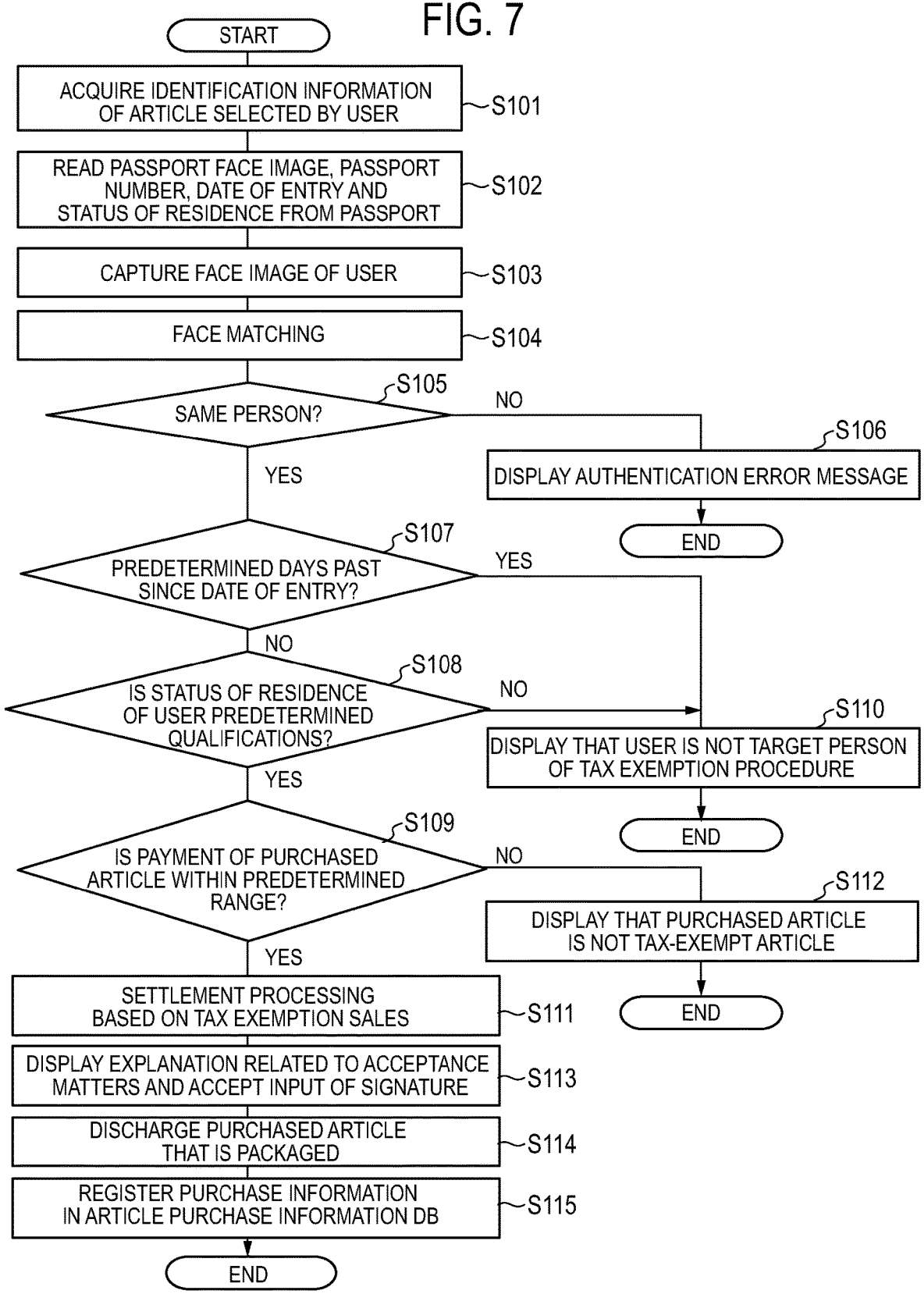
FIG. 7 is a flow chart illustrating a process performed in the vending machine according to the first example embodiment.

FIG. 7 is a flow chart illustrating a process performed in the vending machine 12. This process is performed when the user operates the vending machine 12 in the tax-free store to purchase the tax-exempt article.

In step S101, the CPU 1201 (receiving unit 12a) acquires identification information of the article selected by the user.

In step S102, the CPU 1201 (passport information acquisition unit 12c and residence information acquisition unit 12d) reads information including the passport face image, passport number, the date of entry, and the status of residence from the passport. At this time, it is preferable that the CPU 1201 (determination unit 12f) further determines whether or not the passport is authentic based on information (first physical information) obtained from the passport, such as characters, shape, thickness, and size of the passport. In this way, it is possible to prevent the unauthorized use of forged passports by third parties. Note that, this is not the only way to determine the authenticity of a passport.

In step S103, the CPU 1201 (biometric information acquisition unit 12b) controls the camera 1208 and the depth camera 1209 to capture a face image (hereafter, the image is called "captured face image".) of the user standing in front of the vending machine 12. At this time, it is preferable that the CPU 1201 (determination unit 12f) further determines whether or not the captured face image (first biometric information) has been acquired from the person in front of the device based on information (second physical information) such as three-dimensional shape and size obtained from the user's body. Note that, this prevents third parties from impersonating the user by using photographs or other images. This is not the only way to prevent impersonation. For example, it may be a method in which the user is instructed to change the face orientation and the face image is captured again for determination.

In step S104, the CPU 1201 (matching unit 12e) performs a face matching of the captured face image with the passport face image at one-to-one. When a matching score, indicating the similarity between the captured face image and the passport face image, is equal to or greater than a predetermined threshold, the matching unit 12e authenticates that the user and the person shown in the face image of the passport are the same.

In step S105, the CPU 1201 (determination unit 12f) determines whether or not the user standing in front of the device and the person in the face image on the passport are the same. Here, when the CPU 1201 (determination unit 12f)

determines that the two persons are the same (step S105: YES), the process proceeds to step S107.

On the other hand, when the CPU 1201 (determination unit 12f) determines that the two persons are not the same (step S105: NO), the CPU 1201 displays an authentication error message (step S106), and the process ends.

In step S107, the CPU 1201 (determination unit 12f) compares the difference between the date of entry into the country obtained in step S102 and the current date with a predetermined number of days to determine whether or not the predetermined number of days has passed since the date of entry. When the predetermined number of days has passed since the date of entry (step S107: YES), the process proceeds to step S110. On the other hand, when the predetermined number of days has not passed since the date of entry (step S107: NO), the process proceeds to step S108.

The predetermined number of days sis determined under laws and regulations related to tax exemption. For example, under the current tax exemption system in Japan, even foreigners are not subject to the tax exemption procedures because they are treated as residents if they have been in Japan for more than six months. In this way, for example, the predetermined number of days could be six months.

In step S108, the CPU 1201 (determination unit 12f) determines whether or not the user's status of residence is a predetermined qualification. Here, when the CPU 1201 (determination unit 12f) determines that the user's status of residence is the predetermined qualification (step S108: YES), the process proceeds to step S109. For example, when the status of residence is "Short-stay", the user is determined to be a non-resident and a person who has the predetermined qualifications to be subject to the tax exemption.

On the other hand, when the CPU 1201 (determination unit 12f) determines that the user's status of residence is not a predetermined qualification (step S108: NO), the process proceeds to step S110. For example, when the status of residence is "permanent resident", the user is determined to be a resident who does not have the predetermined qualifications to be subject to the tax exemption.

In step S109, the CPU 1201 (determination unit 12f) determines whether or not the price of the purchased article is within a predetermined range. Here, when the price of the purchased article is within the predetermined range (step S109: YES), the process proceeds to step S111. On the other hand, when the price of the purchased article exceeds the predetermined range (step S109: NO), the CPU 1201 displays that the user is not subject to the tax exemption procedure (step S112), and the process ends.

The predetermined range of the price of the purchased article is determined based on laws and regulations regarding tax exemption. For example, under the current tax exemption system in Japan, general articles are subject to tax exemption if the total amount of daily purchases at one store is equal to or more than 5000 yen. In addition, consumables are subject to tax exemption if the total amount of daily purchases at one store is at least 5000 yen and not more than 500,000 yen.

The determination process in step S109 may, for example, determine for each classification of general articles and consumables whether or not the total payment for each of general articles and consumables is within these ranges. In the example of FIG. 6, "camera" is the tax-exempt article because the payment is equal to or more than 5000 yen, and "medicine" is not the tax-exempt article because the payment is less than 5000 yen.

In step S111, the settlement process by tax exemption is performed. Specifically, the vending machine 12 requests the settlement for the purchase of articles by the user to the settlement server 2 via the tax-free store server 11. In this settlement request, information necessary for settlement is transmitted to the settlement server 2. The information is such as the total payment of the purchased article and settlement information (Credit card numbers, account numbers, personal identification numbers, etc.). When the settlement request is received, the settlement server 2 performs a determination process of the propriety of settlement and a settlement process. In the description of FIG. 7, it is assumed that settlement related to the articles purchased by the user is permitted. In the case where the settlement is processed by cash, it is not necessary to inquire to the settlement server 2. After the step S111, the process proceeds to step S113.

In step S112, the CPU 1201 displays that the purchased article is not the tax-exempt article, and the process ends. When the purchase of the article by the user is not subject to the tax exemption, the sale of the article may be suspended after notifying the user that the article will be taxed, or the article may be sold in the same manner as the sale of the taxable article in general.

In step S113, the CPU 1201 (acceptance unit 12a) displays an explanation of the acceptance matter and accepts the input of a signature from the user. The CPU 1201 automatically inputs the information read from the machine reading area of the passport based on consent from the user into a predetermined entry sheet for requesting an execution of the tax exemption procedure.

In step S114, the CPU 1201 (article discharge unit 12i) controls the article discharging device 1214 to extract the packaged purchased article (tax-exempt article) from inside of the storing device 1213, and discharge them to the discharge port.

In step S115, the CPU 1201 registers the purchase information of the tax-exempt article in the article purchase information DB 31 of the tax exemption information management server 3 through the tax-free store server 11, and the process ends. The purchase information includes the passport number, the name, the gender, and the nationality, that are obtained from the passport. Further, the purchase information includes such as codes identifying the purchased article, the payment of the purchased article, the quantity of the purchased article, and the date of purchase.

The purchase information (purchase record) is information about such as the user's purchased articles and is stored in the tax-free store system 1 for a predetermined period. The purchase information may be provided to customs or tax offices as necessary. The purchase information may also be stored as a document at the tax-free store. In addition, the order of processes described above is only one example. For example, the order of the multiple determination processes may be changed accordingly.

As described above, the system in the present example embodiment acquires the date of entry and residence information of the person using the tax exemption facility. The system determines, based on the date of entry and residence information, whether or not the person is subject to the tax exemption procedure. In this way, compared to methods such as checking whether or not the person is subject to the tax exemption procedure by a staff at the tax exemption facility in consideration of entries in the visa column, a load of manual work can be reduced.

According to the present example embodiment, identity verification can be performed by biometric matching of biometric information such as the user's face image captured in the tax exemption facility against biometric information such as a face image recorded in the passport. It is possible to simplify the work of the staff at the tax-free facility because the identity verification of the user is automatically performed. According to the present example embodiment, an information processing apparatus is provided that can efficiently perform procedures requiring both identity verification of the user and confirmation of the user's qualifications for use.

Second Example Embodiment

An information processing system according to the present example embodiment is a variation of the information processing system of the first example embodiment. In some cases, descriptions of the parts that overlap with the first example embodiment are omitted or simplified. Under the current tax exemption system in Japan, it is not permitted to use devices other than vending machines to perform identity verification at the time of the tax exemption procedure. In the following description, it is assumed that identity verification is permitted at the POS terminal 13.

Figure 8:
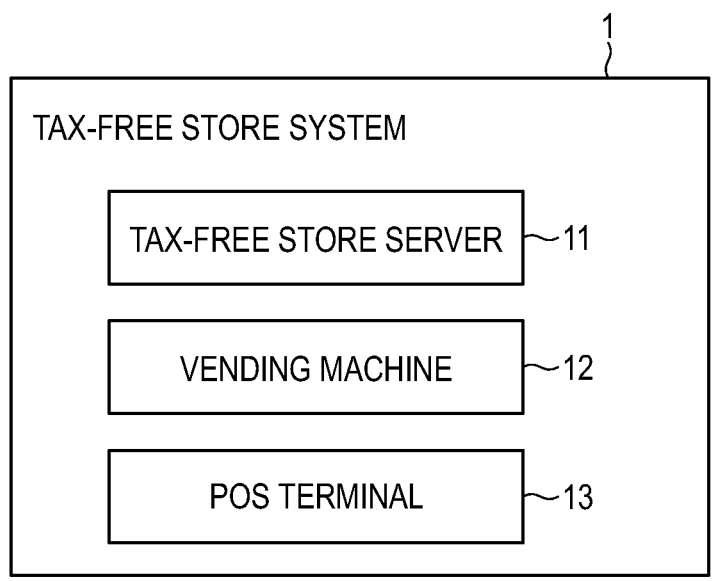
FIG. 8 is a block diagram illustrating the hardware configuration of the tax-free store system according to a second example embodiment.

FIG. 8 is a block diagram illustrating the hardware configuration of the tax-free store system 1 according to the present example embodiment. The tax-free store system 1 according to the present example embodiment further includes a POS terminal 13 in addition to the configuration illustrated in FIG. 2.

The POS terminal 13 is a device that performs a process such as registration of the article to be purchased by the user and settlement for a payment of the purchased articles. The POS terminal 13 may include a computer, a display, a barcode reader, a cash drawer, a card reader, operation buttons, a receipt printer, and the like. It is assumed that the POS terminal 13 according to the present example embodiment is a self-service terminal in which the user performs part or all of the operation by himself/herself, and the POS terminal 13 is except for a typical device in which all of the operations is performed by a staff of the tax-free store.

The tax-free store server 11 stores data used in the tax-free store such as sales data and article (merchandise) data acquired from the POS terminal 13.

Figure 9:
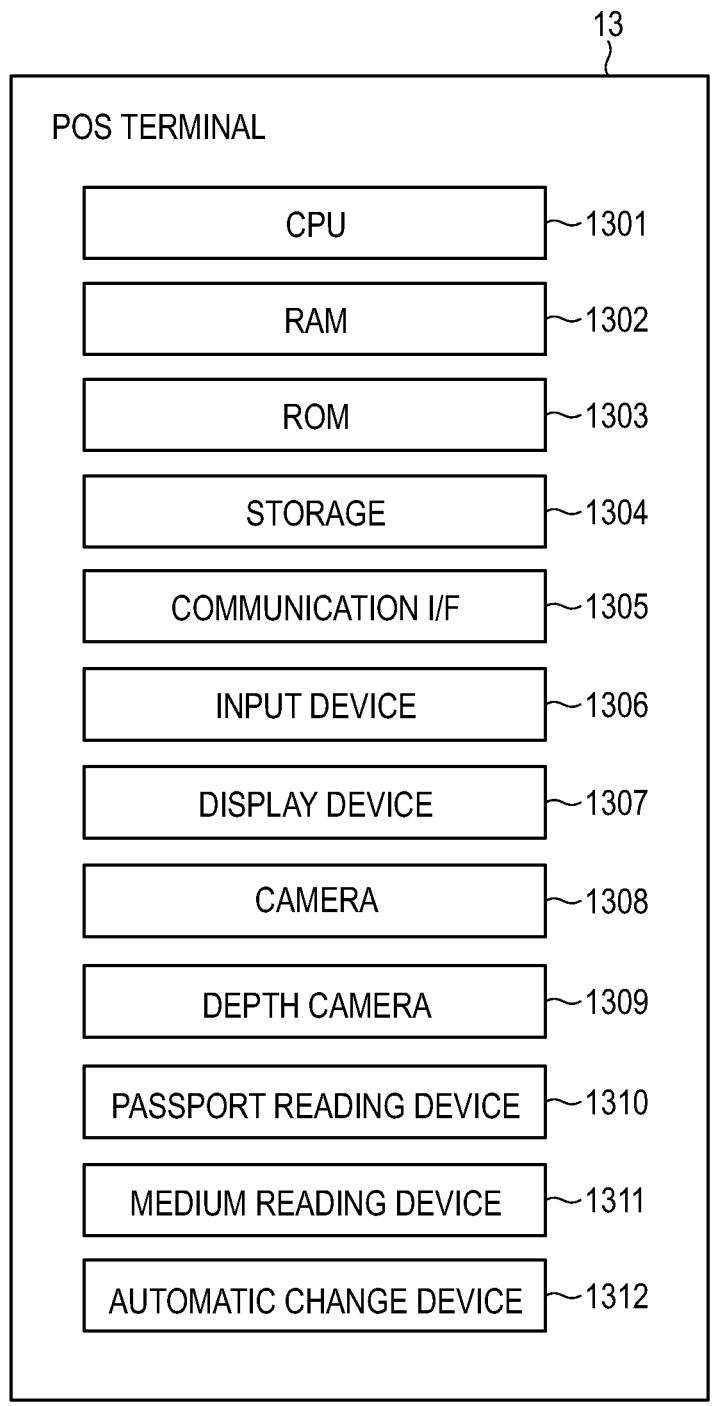
FIG. 9 is a block diagram illustrating the hardware configuration of a POS terminal according to the second example embodiment.

FIG. 9 is a block diagram illustrating the hardware configuration of the POS terminal 13. The POS terminal 13 includes a CPU 1301, a RAM 1302, a ROM 1303, a storage 1304, a communication I/F 1305, an input device 1306, and a display device 1307. The POS terminal 13 also further includes a camera 1308, a depth camera 1309, a passport reading device 1310, a medium reading device 1311, and an automatic change device 1312. Each part of the POS terminal 13 is connected to each other via buses, wiring, driving devices, and the like (not illustrated).

Figure 10:
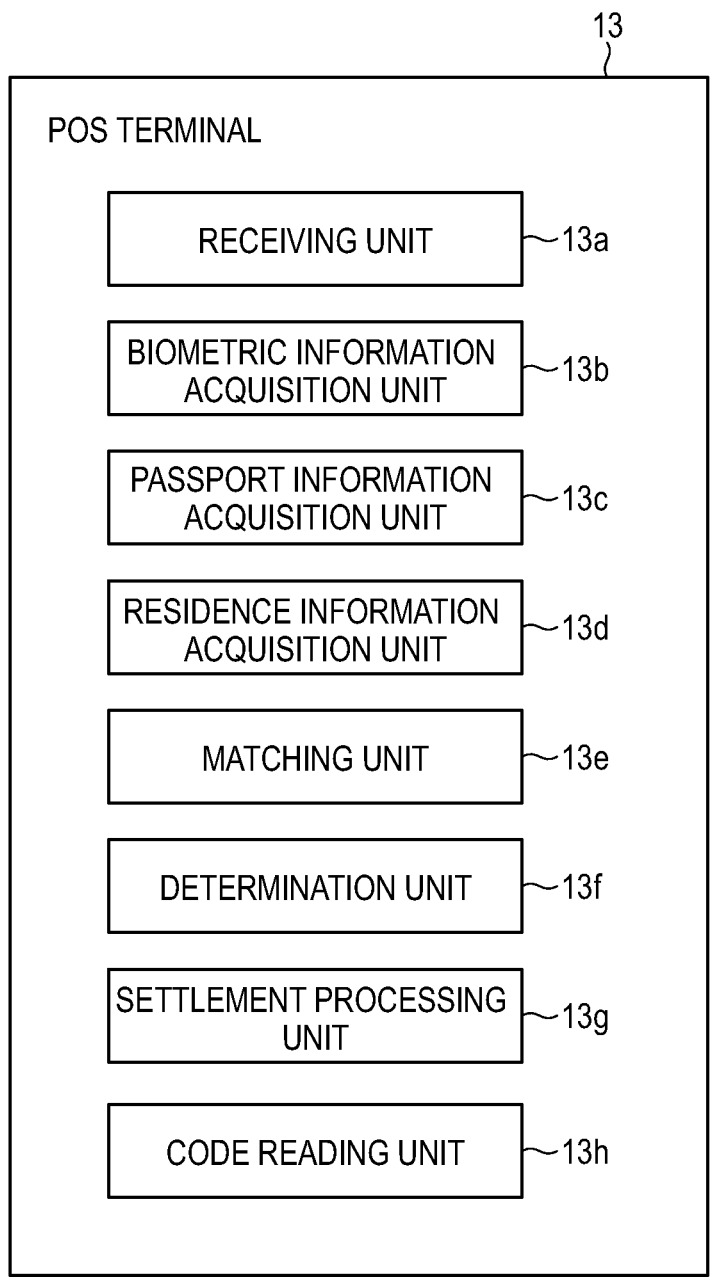
FIG. 10 is a functional block diagram of the POS terminal according to the second example embodiment.

FIG. 10 is a functional block diagram of the POS terminal 13. The POS terminal 13 includes a receiving unit 13a, a biometric information acquisition unit 13b, a passport information acquisition unit 13c, a residence information acquisition unit 13d, a matching unit 13e, a determination unit 13f, a settlement processing unit 13g and a code reading unit 13h. The functions of each unit indicated by the codes 13a to 13g are the same as those each unit indicated by the codes 12a to 12g in FIG. 3, so the description thereof may be omitted.

The code reading unit 13h reads a barcode attached to the surface of the article. The barcode records the identification information of articles. The code reading unit 13h refers to the merchandise data table (not illustrated) of the tax-free store server 11 based on identification information of the article and acquires the registration information such as the name and price of the article.

Figure 11:
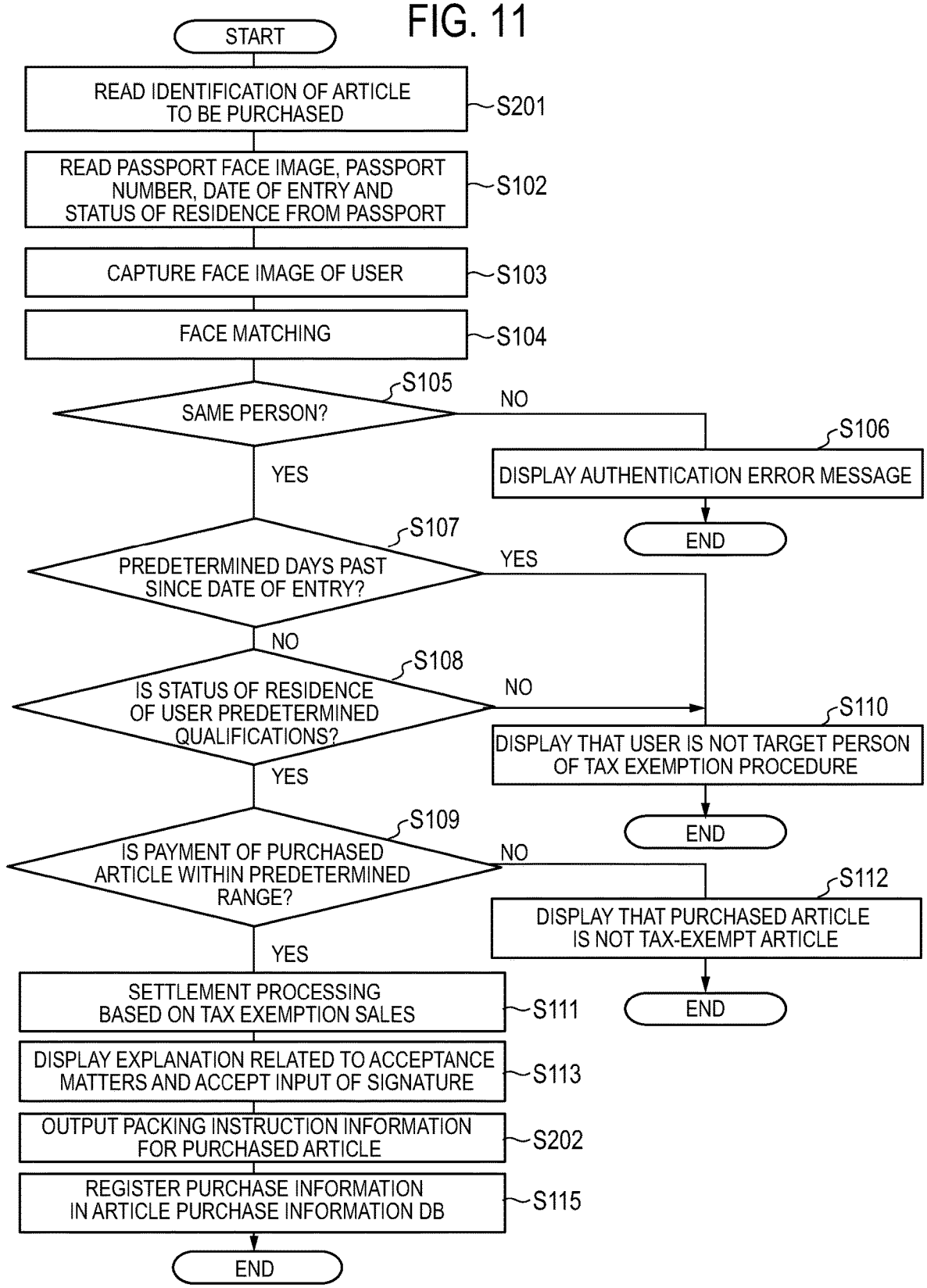
FIG. 11 is a flowchart illustrating a process performed in the POS terminal according to the second example embodiment.

FIG. 11 is a flowchart illustrating a process performed in the POS terminal 13. The process is performed when the user operates the POS terminal 13 in the tax-free store for purchasing the tax-exempt article.

In step S201, the CPU 1301 (code reading unit 13h) reads the identification information of the article to be purchased in response to the operation of the medium reading device 1311 by the user. Since the processes of steps S102 to S113 are the same as those in FIG. 7, the description thereof may be omitted.

In step S202, when the CPU 1301 (receiving unit 13a) receives the input of the signature from the user (see step S113), the CPU 1301 outputs the packing instruction information of the purchased article to the display device 1307, and the like. Then, the process proceeds to step S115.

As described above, in the present example embodiment, when the user operates the POS terminal 13 as in the first example embodiment, it is possible to automatically perform all of a process for identifying the user, a determination process for determining whether or not the user is subject to the tax exemption procedure, and a determination process for determining whether or not the payment of the purchased article satisfies the tax exemption requirements. In this way, the same effect as in the first example embodiment is achieved.

Third Example Embodiment

The present example embodiment differs from the first and second example embodiments described above in that the user performs the tax exemption procedure for the article that the user purchased under a taxed state at the manned register of the tax-free store, using the tax exemption procedure terminal 14 installed in the same tax-free store by himself/herself.

In the present example embodiment, the description thereof may be omitted or simplified as to the parts that overlap with those described in the above embodiment. In addition, as in the second example embodiment, the description will be based on the assumption that identity verification is permitted in devices other than vending machines.

Figure 12:
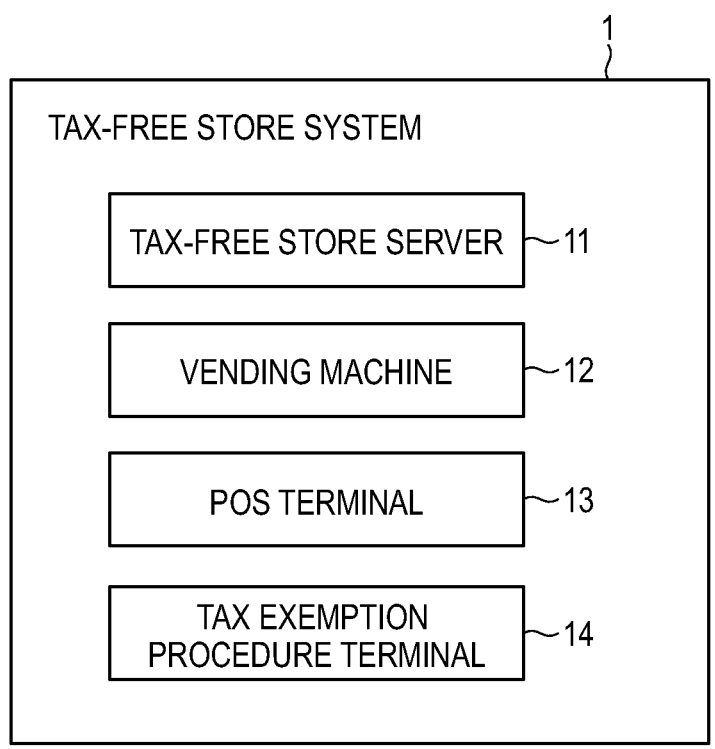
FIG. 12 is a block diagram illustrating the hardware configuration of the tax-free store system according to a third example embodiment.

FIG. 12 is a block diagram illustrating the hardware configuration of the tax-free store system 1 according to the present example embodiment. The tax-free store system 1 according to the present example embodiment further includes a tax exemption procedure terminal 14 in addition to the configuration illustrated in FIG. 2.

The tax exemption procedure terminal 14 is a self-service terminal installed in the tax-free store and is used when the user goes through the tax exemption procedure for the article that has been purchased under a taxed state.

Figure 13:
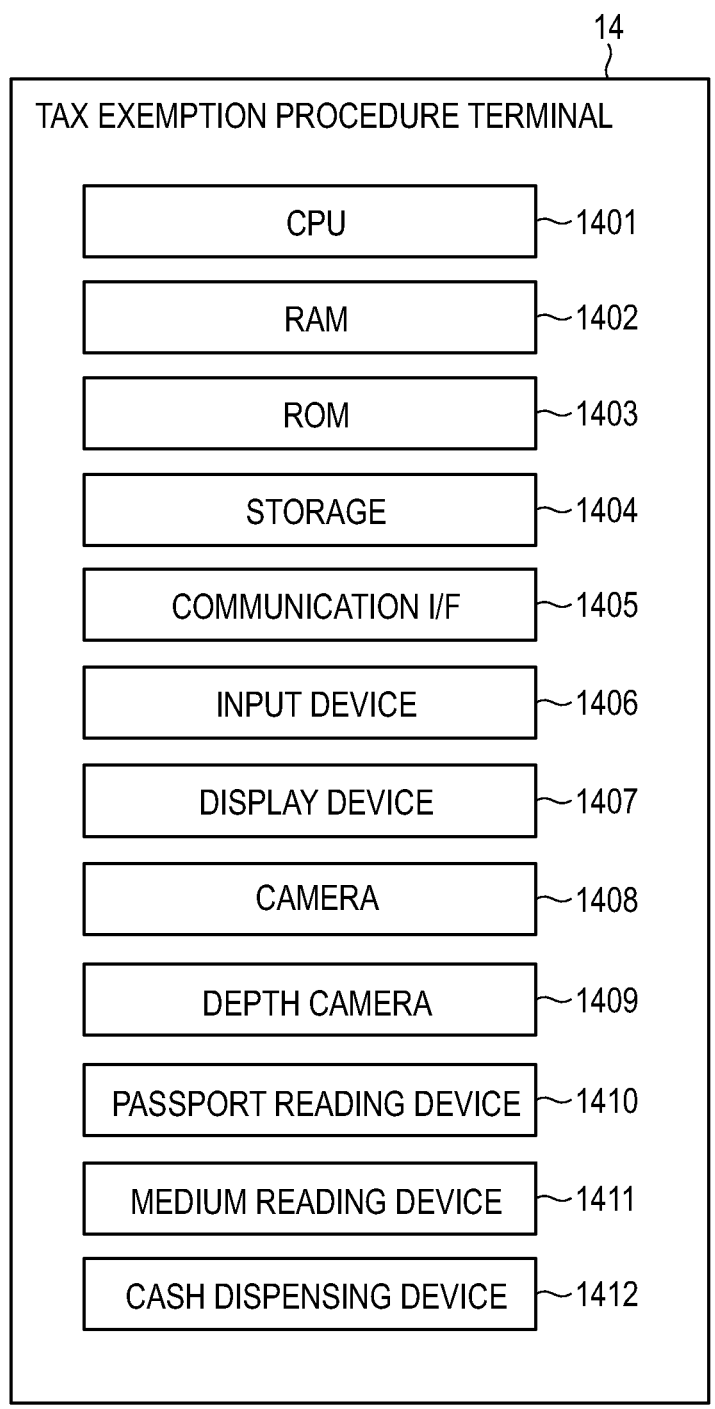
FIG. 13 is a block diagram illustrating the hardware configuration of a tax exemption procedure terminal according to the third example embodiment.

FIG. 13 is a block diagram illustrating the hardware configuration of the tax exemption procedure terminal 14. The tax exemption procedure terminal 14 includes a CPU 1401, a RAM 1402, a ROM 1403, a storage 1404, a communication I/F 1405, an input device 1406, and a display device 1407. The tax exemption procedure terminal 14 also further includes a camera 1408, a depth camera 1409, a passport reading device 1410, a medium reading device 1411, and a cash dispensing device 1412. Each part of the tax exemption procedure terminal 14 is connected to each other via buses, wiring, driving devices, and the like (not illustrated).

The cash dispensing device 1412 is a device that outputs cash in response to the calculated amount to the withdrawal port when the CPU 1401 determines that there is tax to be refunded to the user.

Figure 14:
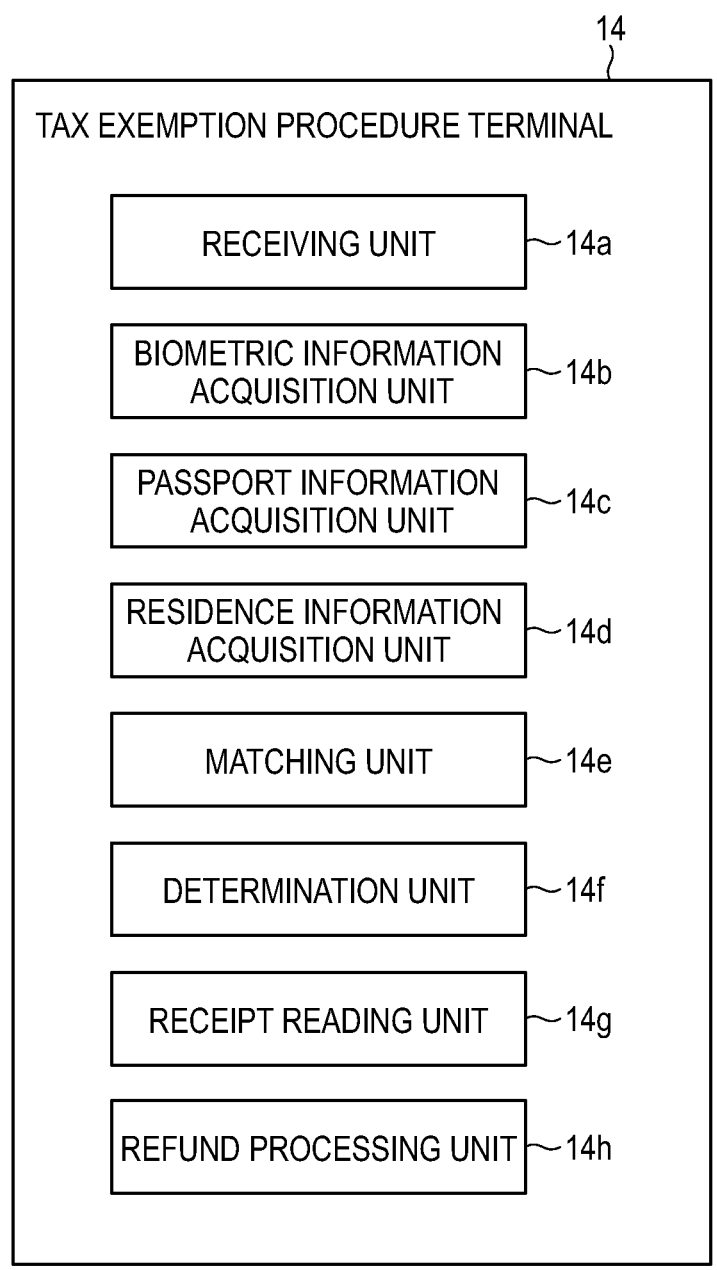
FIG. 14 is a functional block diagram of the tax exemption procedure terminal according to the third example embodiment.

FIG. 14 is a functional block diagram of the tax exemption procedure terminal 14. The tax exemption procedure terminal 14 includes a receiving unit 14a, a biometric information acquisition unit 14b, a passport information acquisition unit 14c, a residence information acquisition unit 14d, a matching unit 14e, a determination unit 14f, a receipt reading unit 14g and a refund processing unit 14h. The functions of each unit indicated by codes 14a to 14f are the same as those of codes 12a to 12f in FIG. 3, so the description thereof may be omitted.

The receipt reading unit 14g reads the receipt where the article purchased by the user and the payment of the purchased article is printed or the barcode on the receipt.

The refund processing unit 14h calculates the amount of tax to be refunded to the user and executes a process to refund the calculated amount to the user. Refund methods include cash refunds and refunds that change the amount charged to the credit card.

Figure 15:
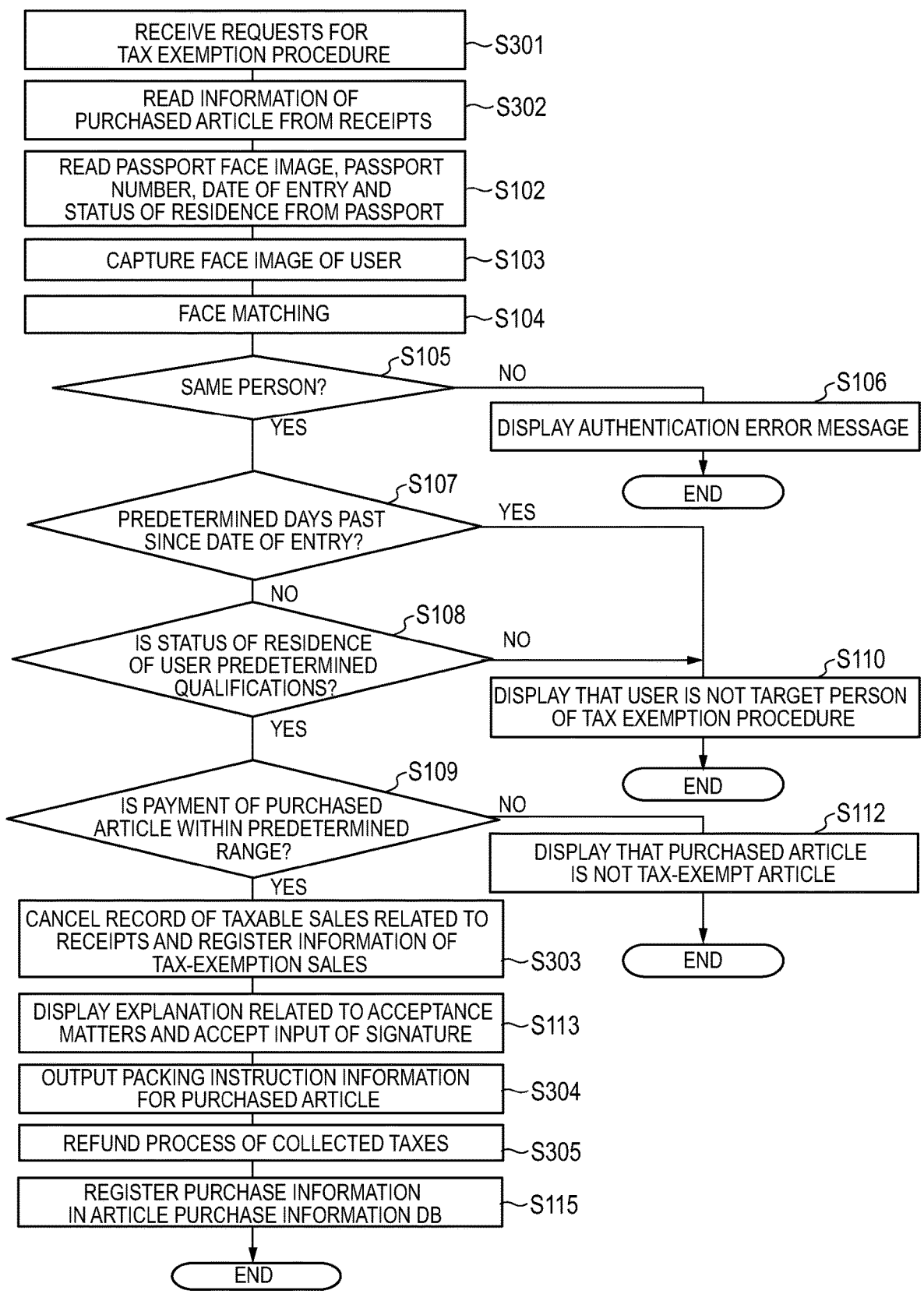
FIG. 15 is a flowchart illustrating a process performed at the tax exemption procedure terminal according to the third example embodiment.

FIG. 15 is a flowchart illustrating a process performed in the tax exemption procedure terminal 14. This process is performed when the user operates the tax exemption procedure terminal 14 in the tax-free store to go through the tax exemption. The user is a person who purchased the tax-exempt article under a taxed state at the tax-free store.

In step S301, the CPU 1401 (receiving unit 14a) accepts the tax exemption procedure request input by the user. Specifically, when the user selects a menu for a tax exemption request from a menu screen displayed on the tax exemption procedure terminal 14, the receiving unit 14a accepts the request for the tax exemption procedure. At this time, the CPU 1401 (receiving unit 14a) displays a guidance screen explaining how to present the passport to the user. The user operates according to the guidance screen.

In step S302, the CPU 1401 (receipt reading unit 14g) reads information about the purchased article from the receipt presented by the user. The CPU 1401 (receipt reader 14g) may acquire the information about the purchased article by reading the barcode described on the receipt. Then, the process proceeds to the step S102.

Since the processes of the steps S102 to S110 and S112 are the same as those in FIG. 7, the description thereof may be omitted. When the identity verification of the user is successful, the process proceeds to step S303.

In step S303, the CPU 1401 (refund processing unit 14h) cancels a record of the tax-exemption sales related to the receipt in the tax-free store server 11 and registers information about the tax-exemption sales. Then, the process proceeds to the step S113.

In step S304, the CPU 1401 outputs packing instruction information of the purchased article. The packing instruction information in the present example embodiment is information that instructs the user or the staff of the tax-free store to pack the purchased article.

In step S305, the CPU 1401 (refund processing unit 14h) executes a refund process of the collected tax. Then, the process proceeds to the step S115.

As described above, in the present example embodiment, the user is allowed to go through the tax exemption procedure for the article that has been purchased under a taxed state at the tax-free store, in the same or affiliated tax-free stores in a self-service manner. Thereby, the user is allowed to request a refund of the difference between the tax-exempted payment and the taxed payment.

Fourth Example Embodiment

Unlike Japan, some countries have a legal system in which taxes was once imposed when a tax-exempt article has been purchased and are refunded when the predetermined procedures are performed at tax exemption procedure places such as refund counters installed at airports. The information processing system according to the present example embodiment provides a function to support the procedure of refunding tax before departure to the person who has purchased the tax-exempt article.

In the present example embodiment, the description thereof may be omitted or simplified for the parts that overlap with those described in the first example embodiment.

FIG. 16 is a schematic diagram illustrating the overall configuration of the information processing system according to the present example embodiment. In addition to the configuration illustrated in FIG. 1, the information processing system in the present example embodiment includes an airport system 4 and an immigration control server 5. The airport system 4 is a core system of the airport that manages passengers. The airport system 4 includes a KIOSK terminal 41 provided on the airport premises. The airport system 4 and the KIOSK terminal 41 are connected through a network NW to be able to communicate with at least the tax exemption information management server 3.

The immigration control server 5 is a server that manages whether or not immigration is properly conducted under laws and regulations by storing the date of entry when a foreigner enters Japan and the date of departure when the foreigner leaves Japan. The immigration control server 5 may further store information about Japanese nationals residing in foreign countries. In other words, the immigration control server 5 stores information about, whether Japanese or foreigners, non-residents who may be subject to tax exemption.

In addition, the information processing system according to the present example embodiment differs from the configuration in FIG. 1 in that the tax exemption information management server 3 further includes a tax exemption qualification confirmation DB 32. The tax exemption qualification confirmation DB 32 is a database that stores information to confirm whether or not a user is a person who is qualified to go through the tax exemption procedure. The tax exemption information management server 3 acquires information on the date of entry (date of landing) and status of residence related to an entrant from the immigration control server 5 at a predetermined time, and updates the tax exemption qualification confirmation DB 32 based on the acquired information.

FIG. 17 is a diagram illustrating an example of information stored in the tax exemption qualification confirmation DB 32. The tax exemption qualification confirmation DB 32 may include "passport number", "name", "date of entry", and "status of residence" as data items. The date of entry is a date on which the user entered Japan (date of landing). Status of residence is a condition of residence set for users. There are several other types of status of residence, in addition to short-stay, technical intern training and permanent resident.

The KIOSK terminal 41 is a self-service terminal operated by the user in the airport and displays information specified by the user from the menu. The KIOSK terminal 41 in the present example embodiment has a menu for inquiring whether or not the user has a tax to be refunded.

Figure 18:
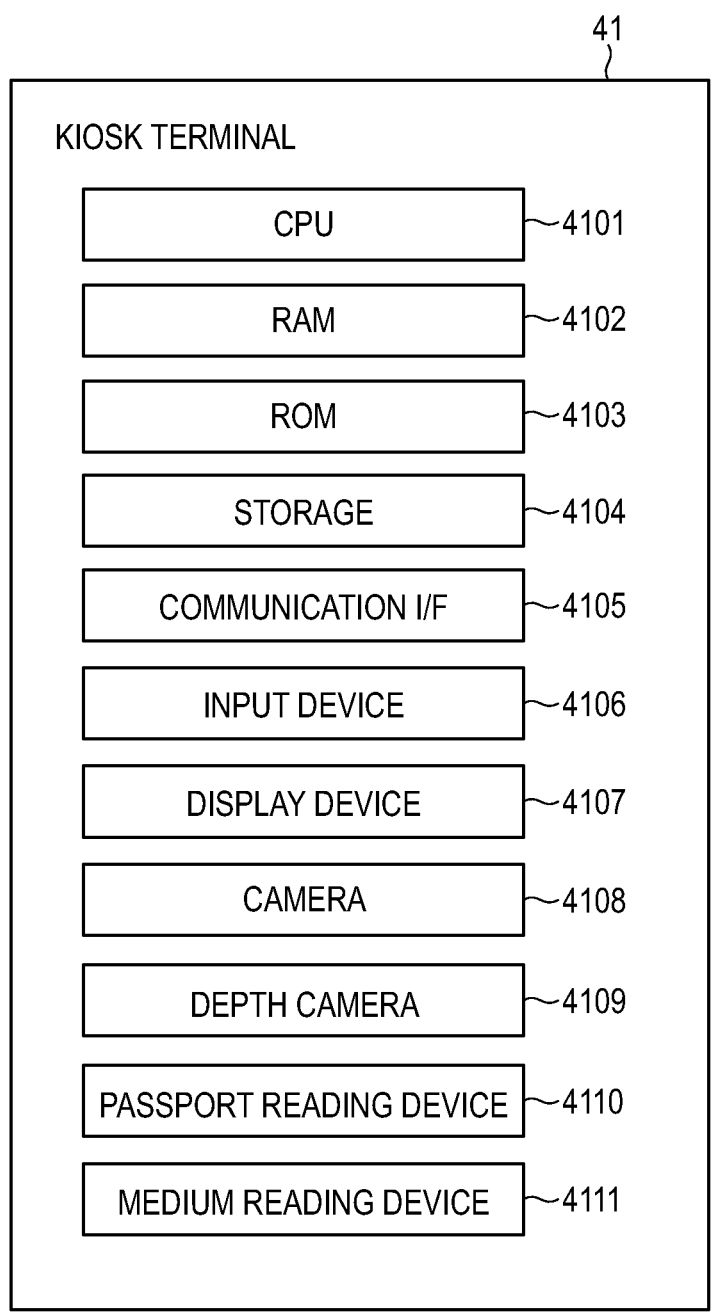
FIG. 18 is a block diagram illustrating the hardware configuration of a KIOSK terminal according to the fourth embodiment.

FIG. 18 is a block diagram illustrating the hardware configuration of the KIOSK terminal 41. The KIOSK terminal 41 includes a CPU 4101, a RAM 4102, a ROM 4103, a storage 4104, a communication I/F 4105, an input device 4106, and a display device 4107. The KIOSK terminal 41 also further includes a camera 4108, a depth camera 4109, a passport reading device 4110, and a medium reading device 4111. The parts of the KIOSK terminal 41 are connected to each other via buses, wiring, drive devices, and the like (not illustrated). The KIOSK terminal 41 may further include a cash dispensing device for dispensing part of the collected tax to the user, as in the case of the third example embodiment.

Figure 19:
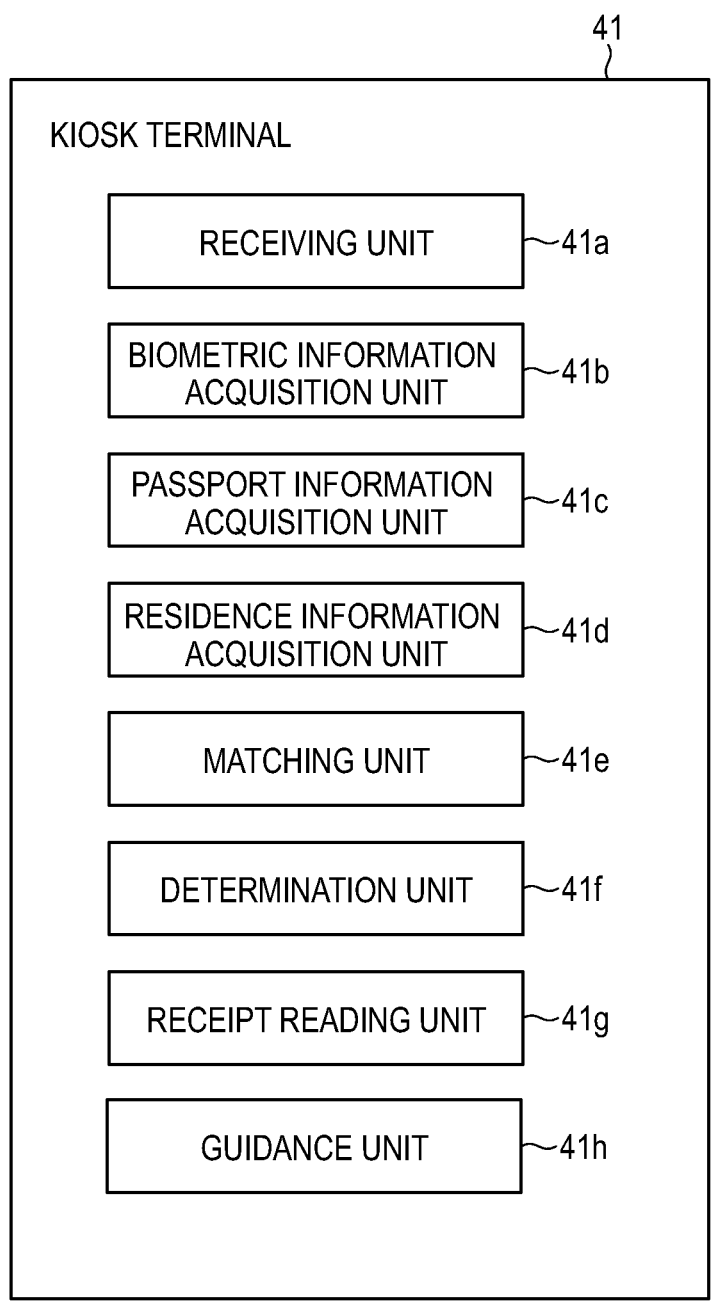
FIG. 19 is a functional block diagram of the KIOSK terminal according to the fourth embodiment.

FIG. 19 is a functional block diagram of the KIOSK terminal 41. The KIOSK terminal 41 includes a receiving unit 41*a*, a biometric information acquisition unit 41*b*, a passport information acquisition unit 41*c*, a residence information acquisition unit 41*d*, a matching unit 41*e*, a determination unit 41*f*, a receipt reading unit 41*g*, and a guidance unit 41*h*. The functions of each unit indicated by codes 41*a* to 41*g* are the same as those of codes 14*a* to 14*g* in FIG. 14, so the description thereof may be omitted.

The guidance unit 41*h* displays guidance information when the user needs to go through the tax exemption procedure. The guidance information includes such as the procedure place of the tax exemption procedure, the current location of the user, the route from the current location to the procedure place, and the amount of tax to be refunded to the user.

Figure 20:
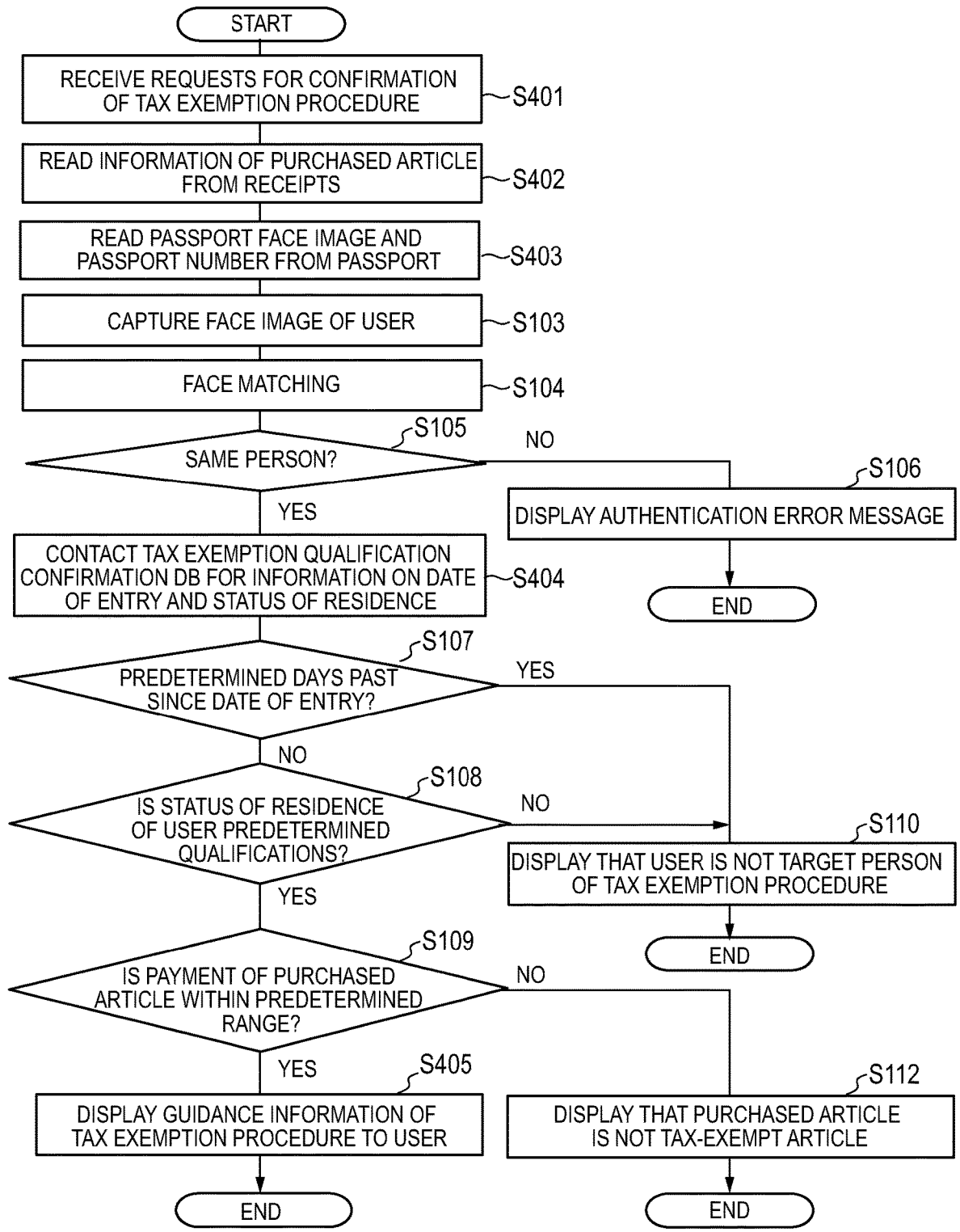
FIG. 20 is a flowchart illustrating a process performed in the KIOSK terminal according to the fourth embodiment.

FIG. 20 is a flowchart illustrating a process performed in the KIOSK terminal 41. This process is performed when the user operates the KIOSK terminal 41 installed in the airport to check whether or not the tax exemption procedure is necessary. The user is a person who purchased the tax-exempt article under a taxed state at the tax-free store in a city.

In step S401, the CPU 4101 (receiving unit 41*a*) receives a request for confirmation of the tax exemption procedure.

In step S402, the CPU 4101 (receipt reading unit 41*g*) reads information about the purchased article from the receipt at the time of purchase.

In step S403, the CPU 4101 (passport information acquisition unit 41*c*) reads a passport face image and a passport number from the passport. Here, unlike in the first example embodiment, it is not necessary to read information about the date of entry and status of residence from the passport. The processes of steps S103 to S106 is the same as those in FIG. 7.

In step S404, the CPU 4101 (determination unit 41*f*) contacts the tax exemption qualification confirmation DB 32 of the tax exemption information management server 3 for information on the date of entry and the status of residence. Then, the process proceeds to the step S107. The processes of steps S107 to S110 and S112 are the same as those in FIG. 7.

In step S405, the CPU 4101 (guidance unit 41*h*) displays guidance information on the tax exemption procedure to the user, and the process ends. The information includes, for example, messages and floor maps illustrating the location of procedures. Examples of messages include such as "Please go through the tax exemption procedure at the tax-free counter set up near the customs." and "In your case, you will receive a total tax refund of XXXX yen.".

According to the present example embodiment, the user is allowed to check whether or not the tax is to be refunded for the tax-exempt article that has been purchased under a taxed state at a tax-free store in a city by operating the KIOSK terminal 41 installed in the airport by himself/herself. In this way, the user surely completes the tax exemption procedure before leaving the country.

Fifth Example Embodiment

The information processing system of the present example embodiment is a variation of the information processing system of the first example embodiment. In some cases, descriptions of the parts that overlap with the first example embodiment are omitted or simplified.

The information processing system of the present example embodiment differs from the first example embodiment in that the determination process of whether or not the user is subject to the tax exemption procedure is performed not by the vending machine 12 in the tax-free store but by the tax exemption information management server 3, which is an external device.

Figure 21:
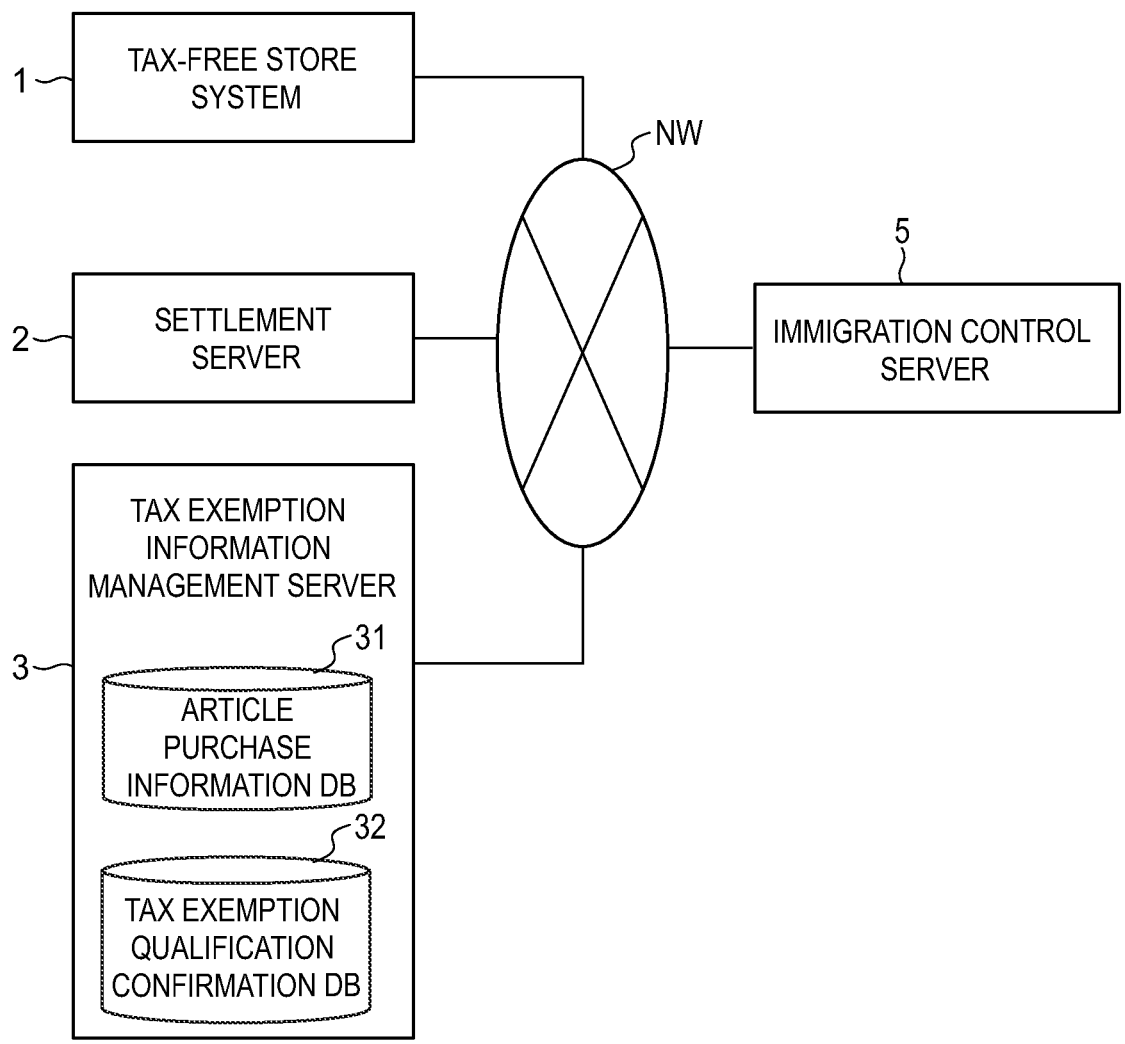
FIG. 21 is a schematic diagram illustrating the overall configuration of the information processing system according to a fifth example embodiment.

FIG. 21 is a schematic diagram illustrating the overall configuration of the information processing system according to the present example embodiment. The information processing system in the present example embodiment differs from the configuration in FIG. 1 in that the tax exemption information management server 3 further includes a tax exemption qualification confirmation DB 32.

Figure 22:
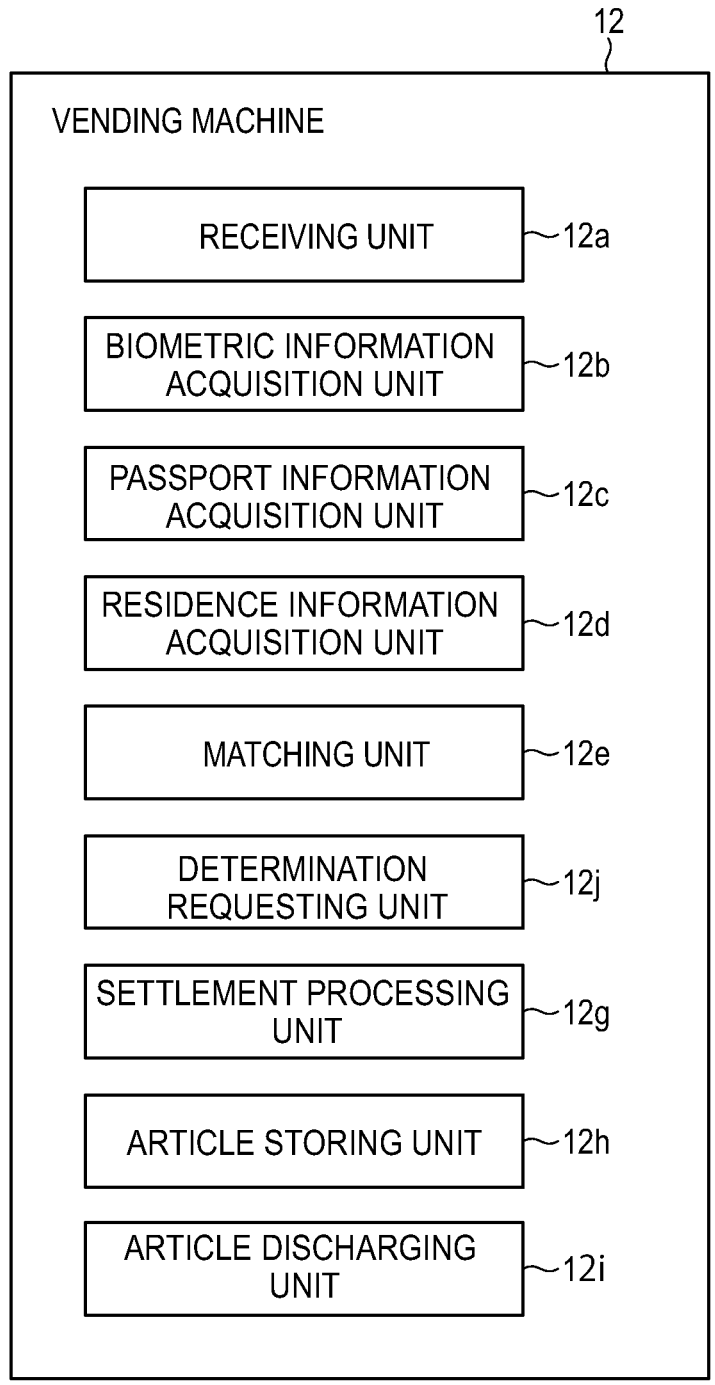
FIG. 22 is a functional block diagram of the vending machine according to the fifth example embodiment.

FIG. 22 is a functional block diagram of the vending machine 12 according to the present example embodiment. The vending machine 12 according to the present example embodiment includes a determination request unit 12*j* instead of the determination unit 12*f* illustrated in FIG. 5.

The determination request unit 12*j* transmits the identification information of the user to the tax exemption information management server 3 and transmits a determination request to inquire whether or not the user is subject to the tax exemption procedure. The determination request unit 12*j* acquires the determination result returned from the tax exemption information management server 3 in response to the determination request. That is, in the present example embodiment, the vending machine 12 does not have a function for determining whether or not the user is subject to the tax exemption procedure.

Figure 23:
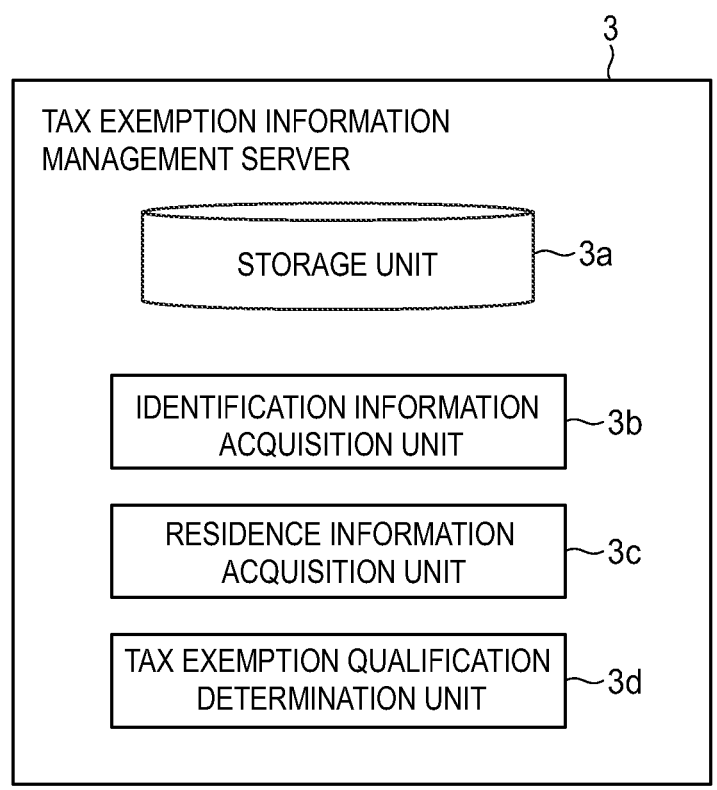
FIG. 23 is a functional block diagram of a tax exemption information management server according to the fifth example embodiment.

FIG. 23 is a functional block diagram of the tax exemption information management server 3 according to the present example embodiment. The tax exemption information management server 3 includes a storage unit 3*a*, an identification information acquisition unit 3*b*, a residence information acquisition unit 3*c* and a tax exemption status determination unit 3*d*.

The storage unit 3*a* is a storage that has an article purchase information DB 31 and a tax exemption qualification confirmation DB 32. The identification information acquisition unit 3*b* acquires identification information for identifying the user. In the present example embodiment, the passport number is used as identification information. The residence information acquisition unit 3*c* acquires the date of entry and status of residence of the user corresponding to the passport number from tax exemption qualification confirmation DB 32. The tax exemption status determination unit 3*d* determines whether or not the user is subject to the tax exemption procedure based on the date of entry and the status of residence, and outputs the determination result.

Figure 24:
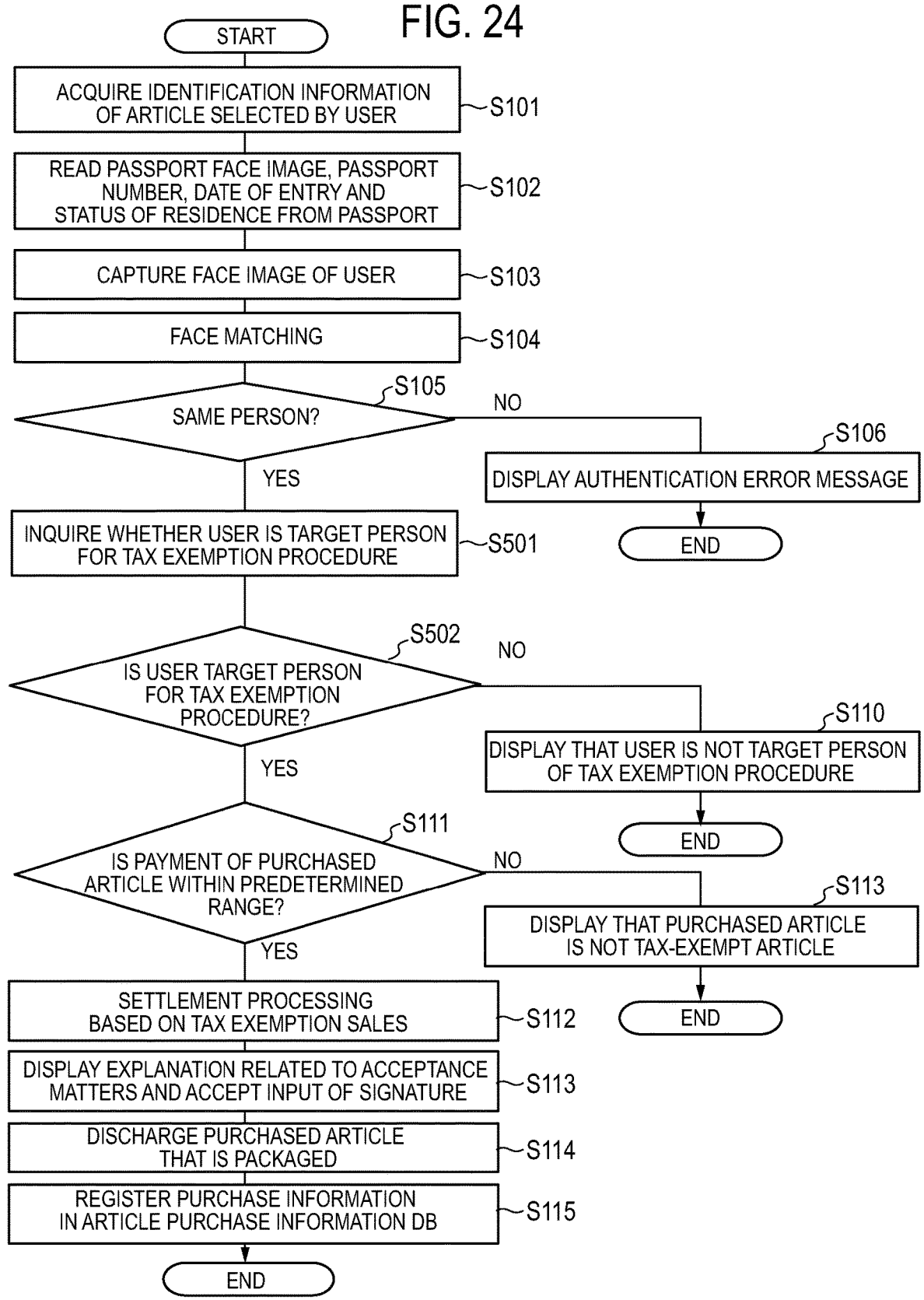
FIG. 24 is a flow chart illustrating a process performed in the vending machine according to the fifth example embodiment.

FIG. 24 is a flow chart illustrating a process performed in the vending machine 12 according to the present example embodiment. This process is performed when the user operates the vending machine 12 in a tax-free store to purchase the tax-exempt article.

Since the processes of the steps S101 to S106 are the same as those in FIG. 7, the description thereof may be omitted. Then, the process proceeds to step S501.

In step S501, the CPU 1201 (determination request unit 12*j*) inquires whether or not the user is subject to the tax exemption procedure by transmitting the passport number to the tax exemption information management server 3. Upon receiving the determination request including the passport number from the vending machine 12, the tax exemption information management server 3 obtains information on the date of entry and status of residence of the user by referring to the tax exemption qualification confirmation DB 32. Upon executing the determination processes of the steps S107 and S108 in FIG. 7, the tax exemption information management server 3 returns the determination result to the vending machine 12.

In step S502, when the determination result returned from the tax exemption information management server 3 indicates that the user is subject to the tax exemption procedure, the CPU 1201 executes processes of the steps S111 to S115, and the process ends.

In this way, according to the present example embodiment, the determination process of whether or not the user is subject to the tax exemption procedure is performed not by the vending machine 12 in the tax-free store but by the tax exemption information management server 3, which is an external device. Since the vending machine 12 can acquire the determination result only by transmitting the passport number to the tax exemption information management server 3, there is an advantage that the vending machine 12 can be implemented more easily than in the case of the first example embodiment. In addition, since the determination process is centrally executed by the tax exemption information management server 3, it is possible to flexibly respond to changes in the tax exemption system.

Sixth Example Embodiment

Figure 25:
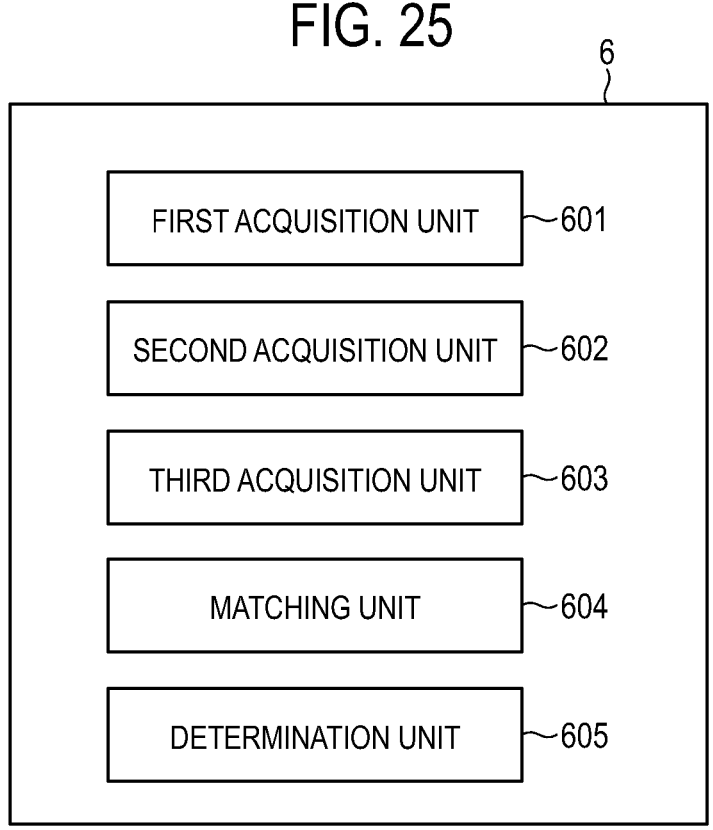
FIG. 25 is a functional block diagram of the information processing apparatus according to a sixth example embodiment.

FIG. 25 is a functional block diagram of the information processing apparatus 6 according to the sixth example embodiment. The information processing apparatus 6 includes a first acquisition unit 601, a second acquisition unit 602, a third acquisition unit 603, a matching unit 604, and a determination unit 605. The first acquisition unit 601 acquires a first biometric information from a body of a user who requests an execution of a procedure. The second acquisition unit 602 acquires a second biometric information of the user from a passport presented by the user. The third acquisition unit 603 acquires qualification information of the user. The matching unit 604 performs a matching process between the first biometric information with the second biometric information. The determination unit 605 determines whether or not the user is a target person of the procedure based on a result of the matching process and the qualification information.

According to the present example embodiment, an information processing apparatus 6 is provided that can efficiently perform procedures requiring both identity verification of a user and confirmation of the user's qualifications for use.

Seventh Example Embodiment

Figure 26:
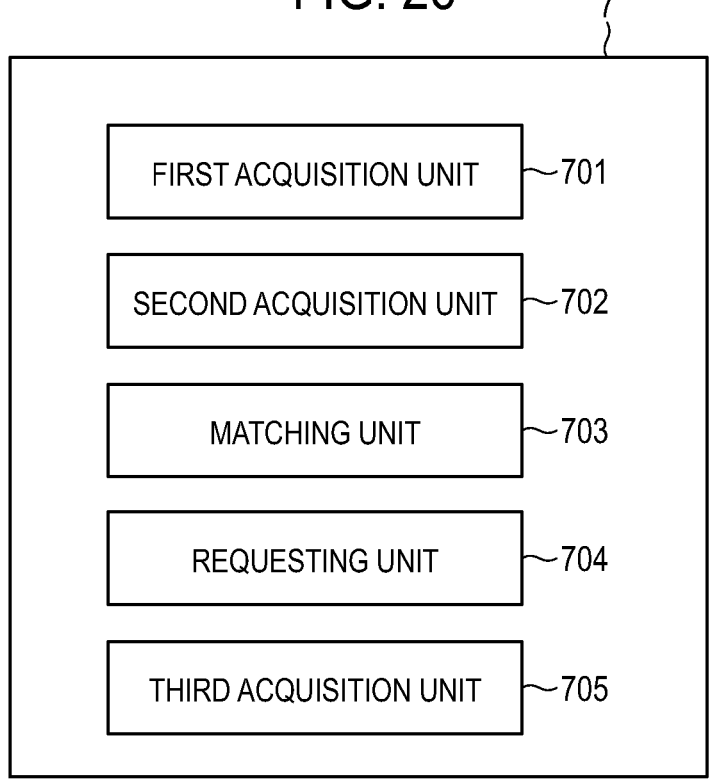
FIG. 26 is a functional block diagram of the information processing apparatus according to a seventh example embodiment.

FIG. 26 is a functional block diagram of the information processing apparatus 7 according to the seventh example embodiment. The information processing apparatus 7 includes a first acquisition unit 701, a second acquisition unit 702, a matching unit 703, a request unit 704, and a third acquisition unit 705. The first acquisition unit 701 acquires a first biometric information from a body of a user who requests an execution of a procedure. The second acquisition unit 702 acquires, from a passport presented by the user, a passport number and a second biometric information of the user. The matching unit 703 performs a matching process between the first biometric information and the second biometric information. The request unit 704 outputs, when the identity verification of the user is successfully completed by the matching process, the passport number to an external device configured to determine whether or not the user is the target person of the procedure based on the passport number. The third acquisition unit 705 acquires a determination result from the external device whether or not the user is the target person.

According to the present example embodiment, an information processing apparatus 7 is provided that can efficiently perform procedures requiring both identity verification of a user and confirmation of the user's qualifications for use.

Modified Example Embodiment

The present invention is not limited to the example embodiments described above and can be changed as appropriate within the scope not departing from the spirit of the present invention. For example, an example in which a configuration of a part of any of the example embodiments is added to another example embodiment or an example in which a configuration of a part of any of the example embodiments is replaced with a configuration of a part of another example embodiment is also an example embodiment of the present invention.

In the above-described example embodiment, the description of the embodiment is made on the premise of the tax exemption system in Japan, but it is not limited to this, and the invention can be used for the tax exemption procedure in any country other than Japan.

In the above embodiment, the tax exemption procedure is explained as a specific example of the procedure that requires both identity verification of the user and confirmation of the user's qualifications for use, but the procedure to which the structure of the invention can be applied is not limited to the tax exemption procedure. The structure of the present invention can also be applied to various procedures such as a check-in procedure at accommodations, a rental car application procedure, and a declaration procedure when a resident in Japan takes an article abroad as a souvenir.

For example, in the check-in procedure at an accommodation facility or the application procedure for a rental car, when it is necessary to confirm the identity and the status of residence by matching the captured face image of the user with the face image recorded in the passport, the procedure can be easily performed using a self-service terminal with the same hardware configuration as the POS terminal 13 described above.

This section also explains the case of the declaration procedure when a resident in Japan takes an article abroad as a souvenir. In this case, the user scans the article using a self-service terminal with the same hardware configuration as the POS terminal 13 described above, and purchases the article with the taxed amount. The user then reads the passport and enters destination information on the self-service terminal. The self-service terminal prints application documents for the tax exemption procedure after returning to the country. Then, if the user uses the application to request the issuance of an export certificate application at customs when leaving the country, the user can receive a tax refund at a tax-free store after returning to the country.

In the above-described example embodiment, it is explained the case in which information such as passport number, passport face image, date of entry, and status of residence is optically acquired from a user's passport by using an OCR device, i.e., a passport reading device and a medium reading device. However, the method of reading by the passport reading device and the medium reading device is not limited to this. For example, the recorded information may be read electromagnetically from an IC tag built into the passport.

The scope of each of the example embodiments also includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the program described above is stored but also the individual program itself. Further, one or two or more components included in the example embodiments described above may be circuitry such as application specific integrated circuit (ASIC), field programmable gate array (FPGA), or the like configured to implement the function of each component.

As the storage medium, for example, a floppy (registered trademark) disk, a hard disk, an optical disk, a magneto-optical disk, a compact disk (CD)-ROM, a magnetic tape, a nonvolatile memory card, or a ROM can be used. Further, the scope of each of the example embodiments also includes an example that operates on operating system (OS) to perform a process in cooperation with another software or a function of an add-in board without being limited to an example that performs a process by an individual program stored in the storage medium.

The service implemented by the function of each example embodiment described above can also be provided to a user in a form of Software as a Service (SaaS).

Note that all the example embodiments described above are to simply illustrate embodied examples in implementing the present invention, and the technical scope of the present invention should not be construed in a limiting sense by those example embodiments. That is, the present invention can be implemented in various forms without departing from the technical concept or the primary feature thereof.

The whole or part of the example embodiments disclosed above can be described as, but not limited to, the following supplementary notes.

(Supplementary Note 1)

An information processing apparatus comprising:
a first acquisition unit that acquires a first biometric information from a body of a user who requests an execution of a procedure;
a second acquisition unit that acquires a second biometric information of the user from a passport presented by the user;
a third acquisition unit that acquires qualification information of the user;
a matching unit that performs a matching process between the first biometric information with the second biometric information; and
a determination unit that determines whether or not the user is a target person of the procedure based on a result of the matching process and the qualification information.

(Supplementary Note 2)

The information processing apparatus according to supplementary note 1, wherein the first biometric information is a face image of the user or the feature amount extracted from the face image.

(Supplementary Note 3)

The information processing apparatus according to supplementary note 1 or 2, wherein the qualification information includes a date of entry into a country of the user and a status of residence in the country of the user, and
wherein the determination unit determines that the user is not the target person for tax exemption when the predetermined number of days have passed since the date of entry.

(Supplementary Note 4)

The information processing apparatus according to any one of supplementary notes 1 to 3, further comprising:
a settlement processing unit that performs a settlement process for a payment of an article to be purchased by the user when the user is determined to be the target person.

(Supplementary Note 5)

The information processing apparatus according to supplementary note 4, wherein the determination unit further determines, based on a payment of the article, whether or not the article is subject to tax exemption.

(Supplementary Note 6)

The information processing apparatus according to supplementary note 4 or 5, further comprising:
a receiving unit that receives input operations from the user, and
wherein the first acquisition unit, the second acquisition unit, the third acquisition unit, the matching unit, the determination unit, and the settlement processing unit each perform a process corresponding to the input operations.

(Supplementary Note 7)

The information processing apparatus according to supplementary note 6, further comprising:
a storage unit that stores a target article being subject to tax exemption; and
a discharge unit that discharges the article purchased by the user among the target articles from the storage unit upon completion of the settlement process.

(Supplementary Note 8)

The information processing apparatus according to any one of supplementary notes 1 to 3, further comprising:
a calculation unit that calculates a refund amount corresponding to a payment of the article purchased by the user when the user is determined to be the target person; and
a refund unit that performs a refund process based on the refund amount.

(Supplementary Note 9)

The information processing apparatus according to any one of supplementary notes 1 to 8, wherein the determination unit further determines, based on a first physical information obtained from the passport, whether or not the passport is genuine.

(Supplementary Note 10)

The information processing apparatus according to any one of supplementary notes 1 to 9, wherein the determination unit further determines, based on a second physical information obtained from a body of the user, whether or not the first biometric information is obtained from a person in front of the information processing apparatus.

(Supplementary Note 11)

The information processing apparatus according to any one of supplementary notes 1 to 10, wherein the third acquisition unit acquires the qualification information by optically reading the passport.

(Supplementary Note 12)

The information processing apparatus according to any one of supplementary notes 1 to 10, wherein the second acquisition unit further acquires a passport number from the passport, and wherein the third acquisition unit acquires the qualification information based on the passport number from a storage device that stores the passport number and the qualification information in association with each other.

(Supplementary Note 13)

The information processing apparatus according to any one of supplementary notes 1 to 11, wherein the second acquisition unit acquires the second biometric information based on a face picture of the user on the passport.

(Supplementary Note 14)

The information processing apparatus according to any one of supplementary notes 1 to 11, wherein the second acquisition unit acquires the second biometric information from the electromagnetic recording medium built in the passport.

(Supplementary Note 15)

An information processing method comprising:
acquiring a first biometric information from a body of a user who requests an execution of a procedure;
acquiring a second biometric information of the user from a passport presented by the user;
acquiring qualification information of the user;
performing a matching process between the first biometric information and the second biometric information; and
determining whether or not the user is a target person of the procedure based on a result of the matching process and the qualification information.

(Supplementary Note 16)

A storage medium storing a program that causes a computer to perform:
acquiring a first biometric information from a body of a user who requests an execution of a procedure;
acquiring a second biometric information of the user from a passport presented by the user;
acquiring qualification information of the user;
performing a matching process between the first biometric information and the second biometric information; and
determining whether or not the user is a target person of the procedure based on a result of the matching process and the qualification information.

(Supplementary Note 17)

An information processing apparatus comprising:
a first acquisition unit that acquires a first biometric information from a body of a user who requests an execution of a procedure;
a second acquisition unit that acquires, from a passport presented by the user, a passport number and a second biometric information of the user;
a matching unit that performs a matching process between the first biometric information and the second biometric information;
a requesting unit that outputs, when the identity verification of the user is successfully completed by the matching process, the passport number to an external device configured to determine whether or not the user is the target person of the procedure based on the passport number; and
a third acquisition unit that acquires a determination result from the external device whether or not the user is the target person.

(Supplementary Note 18)

An information processing method comprising:
acquiring a first biometric information from a body of a user who requests an execution of a procedure;
acquiring, from a passport presented by the user, a passport number and a second biometric information of the user;
performing a matching process between the first biometric information and the second biometric information;
outputting, when the identity verification of the user is successfully confirmed by the matching process, the passport number to an external device configured to determine whether or not the user is the target person of the procedure based on the passport number; and
acquiring a determination result from the external device whether or not the user is the target person.

(Supplementary Note 19)

A storage medium storing a program that causes a computer to perform:
acquiring a first biometric information from a body of a user who requests an execution of a procedure;
acquiring, from a passport presented by the user, a passport number and a second biometric information of the user;
performing a matching process between the first biometric information and the second biometric information;
outputting, when the identity verification of the user is successfully confirmed by the matching process, the passport number to an external device configured to determine whether or not the user is the target person of the procedure based on the passport number; and
acquiring a determination result from the external device whether or not the user is the target person.

This application is based upon and claims the benefit of priority from Japanese Patent Application No. 2020-75514, filed on Apr. 21, 2020, the disclosure of which is incorporated herein in its entirety by reference.

REFERENCE SIGNS LIST

1 NW network
1 tax-free store system
2 settlement server
3 tax exemption information management server
4 airport system
5 immigration control server
6, 7 information processing apparatus
11 tax-free store server
12 vending machine
13 POS terminal
14 tax exemption procedure terminal
31 article purchase information DB
32 tax exemption qualification DB
41 KIOSK terminal

What is claimed is:

1. An information processing apparatus comprising:
at least one memory storing instructions; and
at least one processor configured to execute the instructions to:
acquire a first biometric information from a face of a user who requests an execution of a procedure;
acquire a second biometric information of the user and a date of entry into a country by the user from a passport presented by the user, wherein acquiring the second biometric information of the user comprises acquiring the second biometric information from an electromagnetic recording medium built in the passport;

perform a matching process between the first biometric information with the second biometric information;
determine whether the user is a person that is eligible for tax exemption based on biometric recognition results and a predetermined number of days having passed since the date of entry;
perform a settlement process for a payment of an article to be purchased by the user when the user is determined to be a target person;
receive input operations from the user;
perform a process corresponding to the input operations;
determine, based on a second physical information obtained from the face of the user, whether or not the first biometric information is obtained from a real human in front of the information processing apparatus, the second physical information comprising three-dimensional information and shape of the face of the user;
store target articles being subject to tax exemption in a storage unit; and
discharge the article purchased by the user among the target articles from the storage unit upon completion of the settlement process.

2. The information processing apparatus according to claim 1, wherein the first biometric information is a face image of the user or the feature amount extracted from the face image.

3. The information processing apparatus according to claim 1, wherein the at least one processor is further configured to execute the instructions to:
calculate a refund amount corresponding to a payment of an article purchased by the user when the user is determined to be a target person; and
perform a refund process based on the refund amount.

4. The information processing apparatus according to claim 1, wherein the at least one processor is further configured to execute the instructions to:
determine, based on a first physical information obtained from the passport, whether or not the passport is genuine.

5. The information processing apparatus according to claim 1, wherein the at least one processor is further configured to execute the instructions to:
acquire qualification information by optically reading the passport.

6. The information processing apparatus according to claim 5, wherein the qualification information further includes a status of residence in the country of the user.

7. The information processing apparatus according to claim 1, wherein the at least one processor is further configured to execute the instructions to:
acquire a passport number from the passport, and
acquire qualification information based on the passport number from a storage device that stores the passport number and the qualification information in association with each other.

8. The information processing apparatus according to claim 1, wherein the at least one processor is further configured to execute the instructions to:
acquire the second biometric information based on a face picture of the user on the passport.

9. The information processing apparatus according to claim 1, wherein the target person is a person for the tax exemption.

10. An information processing method comprising:
acquiring a first biometric information from a face of a user who requests an execution of a procedure;
acquiring a second biometric information of the user and a date of entry into a country by the user from a passport presented by the user, wherein acquiring the second biometric information of the user comprises acquiring the second biometric information from an electromagnetic recording medium built in the passport;
performing a matching process between the first biometric information and the second biometric information; and
determining whether the user is a person that is eligible for tax exemption based on biometric recognition results and a predetermined number of days having passed since the date of entry;
performing a settlement process for a payment of an article to be purchased by the user when the user is determined to be a target person;
receiving input operations from the user;
performing a process corresponding to the input operations;
determining, based on a second physical information obtained from the face of the user, whether or not the first biometric information is obtained from a real human in front of the information processing apparatus, the second physical information comprising three-dimensional information and shape of the face of the user;
storing target articles being subject to tax exemption in a storage unit; and
discharging the article purchased by the user among the target articles from the storage unit upon completion of the settlement process.

11. A non-transitory storage medium storing a program that causes a computer to perform:
acquiring a first biometric information from a face of a user who requests an execution of a procedure;
acquiring a second biometric information of the user and a date of entry into a country by the user from a passport presented by the user, wherein acquiring the second biometric information of the user comprises acquiring the second biometric information from an electromagnetic recording medium built in the passport;
performing a matching process between the first biometric information and the second biometric information; and
determining whether the user is a person that is eligible for tax exemption based on biometric recognition results and a predetermined number of days having passed since the date of entry;
performing a settlement process for a payment of an article to be purchased by the user when the user is determined to be a target person;
receiving input operations from the user;
performing a process corresponding to the input operations;
determining, based on a second physical information obtained from the face of the user, whether or not the first biometric information is obtained from a real human in front of the information processing apparatus, the second physical information comprising three-dimensional information and shape of the face of the user;
storing target articles being subject to tax exemption in a storage unit; and discharging the article purchased by the user among the target articles from the storage unit upon completion of the settlement process.

12. An information processing apparatus comprising:
at least one memory storing instructions; and
at least one processor configured to execute the instructions to:
  acquire a first biometric information from a face of a user who requests an execution of a procedure;
  acquire, from a passport presented by the user, a passport number and a second biometric information of the user, wherein acquiring the second biometric information of the user comprises acquiring the second biometric information from an electromagnetic recording medium built in the passport;
  perform a matching process between the first biometric information and the second biometric information;
  output, when the identity verification of the user is successfully completed by the matching process, the passport number to an external device configured to determine whether or not the user is the target person of the procedure based on the passport number; and
  acquire a determination result from the external device whether or not the user is the target person;
  perform a settlement process for a payment of an article to be purchased by the user when the user is determined to be a target person;
  receive input operations from the user;
  perform a process corresponding to the input operations;
  determine, based on a second physical information obtained from the face of the user, whether or not the first biometric information is obtained from a real human in front of the information processing apparatus, the second physical information comprising three-dimensional information and shape of the face of the user;
  store target articles being subject to tax exemption in a storage unit; and
  discharge the article purchased by the user among the target articles from the storage unit upon completion of the settlement process.

13. An information processing method comprising:
acquiring a first biometric information from a face of a user who requests an execution of a procedure;
acquiring, from a passport presented by the user, a passport number and a second biometric information of the user, wherein acquiring the second biometric information of the user comprises acquiring the second biometric information from an electromagnetic recording medium built in the passport;
performing a matching process between the first biometric information and the second biometric information;
outputting, when the identity verification of the user is successfully confirmed by the matching process, the passport number to an external device configured to determine whether or not the user is the target person of the procedure based on the passport number; and
acquiring a determination result from the external device whether or not the user is the target person;
performing a settlement process for a payment of an article to be purchased by the user when the user is determined to be a target person;
receiving input operations from the user;
performing a process corresponding to the input operations;
determining, based on a second physical information obtained from the face of the user, whether or not the first biometric information is obtained from a real human in front of the information processing apparatus, the second physical information comprising three-dimensional information and shape of the face of the user;
storing target articles being subject to tax exemption in a storage unit; and
discharging the article purchased by the user among the target articles from the storage unit upon completion of the settlement process.

14. A non-transitory storage medium storing a program that causes a computer to perform:
acquiring a first biometric information from a face of a user who requests an execution of a procedure;
acquiring, from a passport presented by the user, a passport number and a second biometric information of the user, wherein acquiring the second biometric information of the user comprises acquiring the second biometric information from an electromagnetic recording medium built in the passport;
performing a matching process between the first biometric information and the second biometric information;
outputting, when the identity verification of the user is successfully confirmed by the matching process, the passport number to an external device configured to determine whether or not the user is the target person of the procedure based on the passport number; and
acquiring a determination result from the external device whether or not the user is the target person;
performing a settlement process for a payment of an article to be purchased by the user when the user is determined to be a target person;
receiving input operations from the user;
performing a process corresponding to the input operations;
determining, based on a second physical information obtained from the face of the user, whether or not the first biometric information is obtained from a real human in front of the information processing apparatus, the second physical information comprising three-dimensional information and shape of the face of the user;
storing target articles being subject to tax exemption in a storage unit; and
discharging the article purchased by the user among the target articles from the storage unit upon completion of the settlement process.

* * * * *